US011194760B1

(12) United States Patent
Puhov et al.

(10) Patent No.: US 11,194,760 B1
(45) Date of Patent: Dec. 7, 2021

(54) FAST OBJECT SNAPSHOT VIA BACKGROUND PROCESSING

(71) Applicant: EMC IP Holding Company LLC, Hopkinton, MA (US)

(72) Inventors: Peter Puhov, Shrewsbury, MA (US); Richard P. Ruef, Santa Cruz, CA (US); William C. Davenport, San Diego, CA (US); Socheavy Heng, Cranston, RI (US)

(73) Assignee: EMC IP Holding Company LLC, Hopkinton, MA (US)

( * ) Notice: Subject to any disclaimer, the term of this patent is extended or adjusted under 35 U.S.C. 154(b) by 476 days.

(21) Appl. No.: 15/662,483

(22) Filed: Jul. 28, 2017

(51) Int. Cl.
*G06F 17/30* (2006.01)
*G06F 16/11* (2019.01)

(52) U.S. Cl.
CPC ........ *G06F 16/128* (2019.01); *G06F 2201/84* (2013.01)

(58) Field of Classification Search
CPC .......................... G06F 16/128; G06F 2201/84
See application file for complete search history.

(56) References Cited

U.S. PATENT DOCUMENTS

| 6,792,518 | B2 | 9/2004 | Armangau et al. |
| 6,934,822 | B2 | 8/2005 | Armangau et al. |
| 6,957,362 | B2 | 10/2005 | Armangau |
| 7,035,881 | B2 | 4/2006 | Tummala et al. |
| 7,546,431 | B2 | 6/2009 | Stacey et al. |
| 8,620,973 | B1 * | 12/2013 | Veeraswamy ......... G06F 16/128 707/822 |
| 8,818,951 | B1 | 8/2014 | Muntz et al. |
| 9,009,114 | B1 * | 4/2015 | Sridharan ........... G06F 16/1873 707/646 |
| 9,646,024 | B2 * | 5/2017 | Srivas .................... G06F 16/275 |
| 10,025,806 | B2 * | 7/2018 | Lu .......................... G06F 3/0689 |
| 2012/0066182 | A1 * | 3/2012 | Chang .................... G06F 16/128 707/639 |
| 2013/0036418 | A1 * | 2/2013 | Yadappanavar ...... G06F 3/0611 718/1 |
| 2015/0269032 | A1 * | 9/2015 | Muthyala .............. G06F 3/0607 707/639 |
| 2016/0210302 | A1 * | 7/2016 | Xia ........................ G06F 3/1285 |
| 2018/0165208 | A1 * | 6/2018 | Farey .................. G06F 12/0868 |

* cited by examiner

*Primary Examiner* — Huawen A Peng
(74) *Attorney, Agent, or Firm* — BainwoodHuang

(57) ABSTRACT

Techniques for creating snapshots of data storage objects that can perform certain operations (e.g., flushing dirty data, setting up extent pointers, allocating block storage space, etc.) during background (or deferred) processing. The disclosed techniques employ one or more extent copy trackers that can be created during processing of a transaction, while I/O request from host computers are suspended. The extent copy trackers are configured to perform some or all of the certain operations in the background, after the transaction has been committed and/or the processing of the transaction has been completed. By performing such operations during background processing, a processing time required to complete the snapshot transaction is reduced, thereby reducing latency in the resumption of the I/O requests from the host computers.

19 Claims, 30 Drawing Sheets

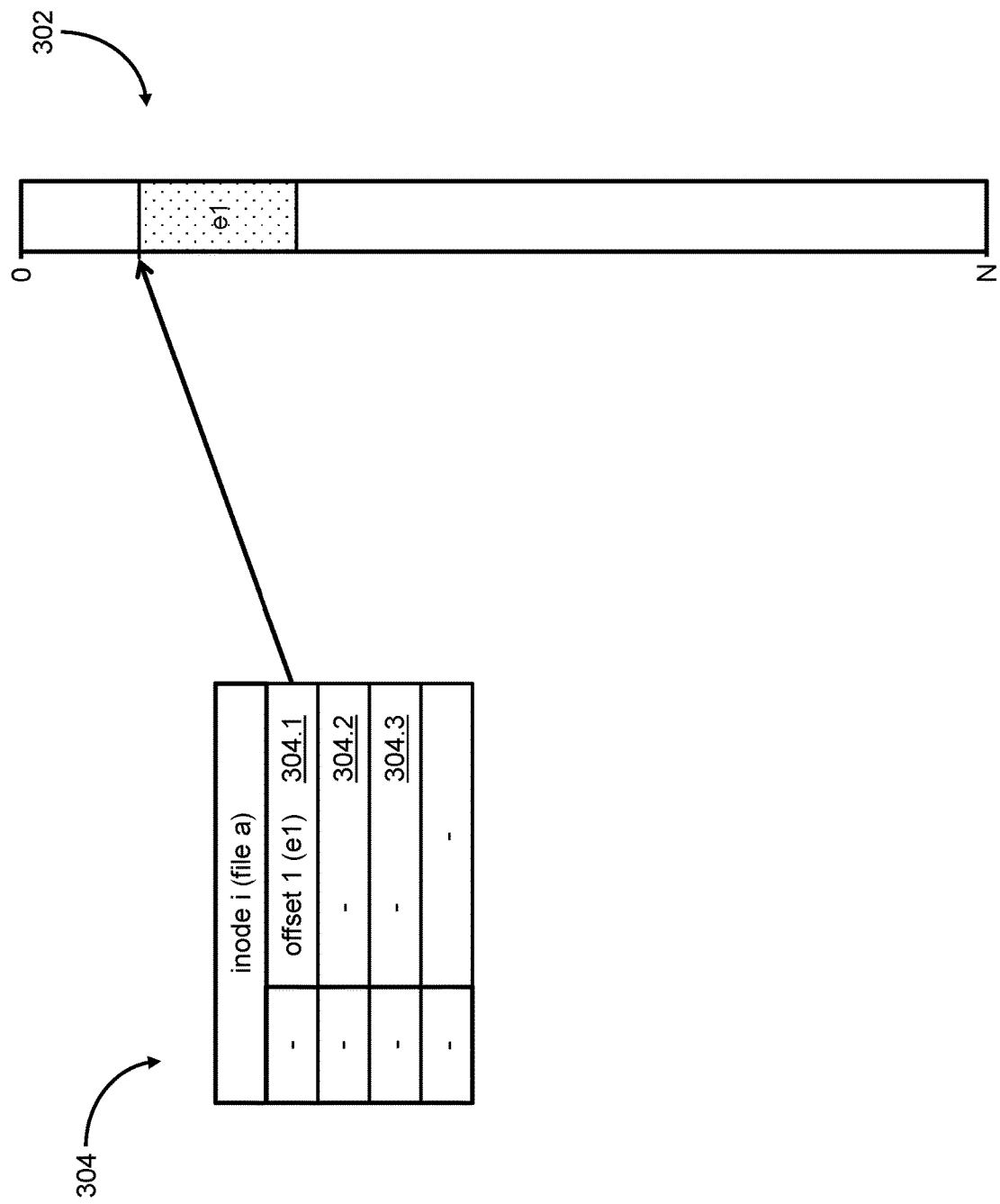
Fig. 3a(1)

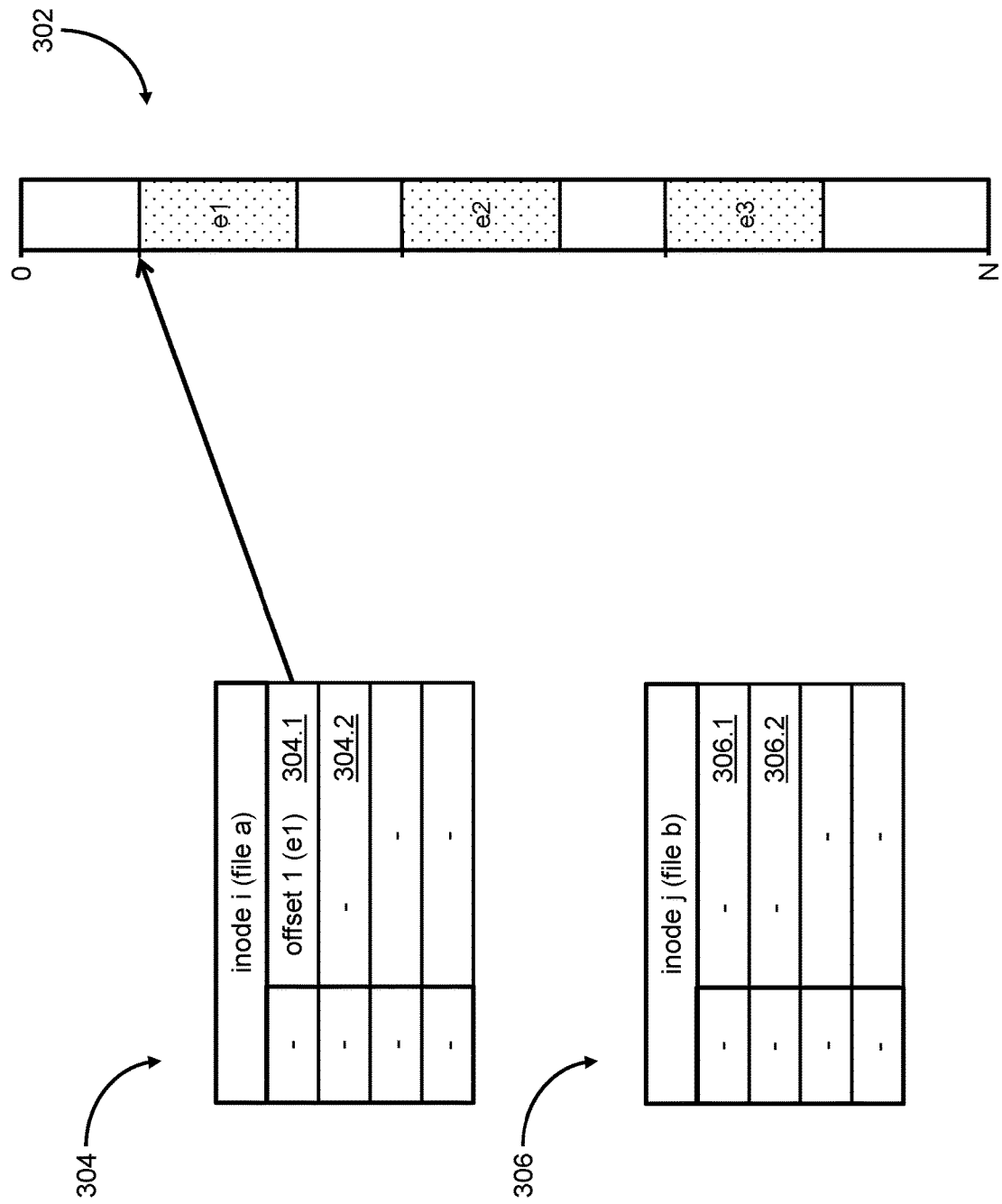
Fig. 3a(2)

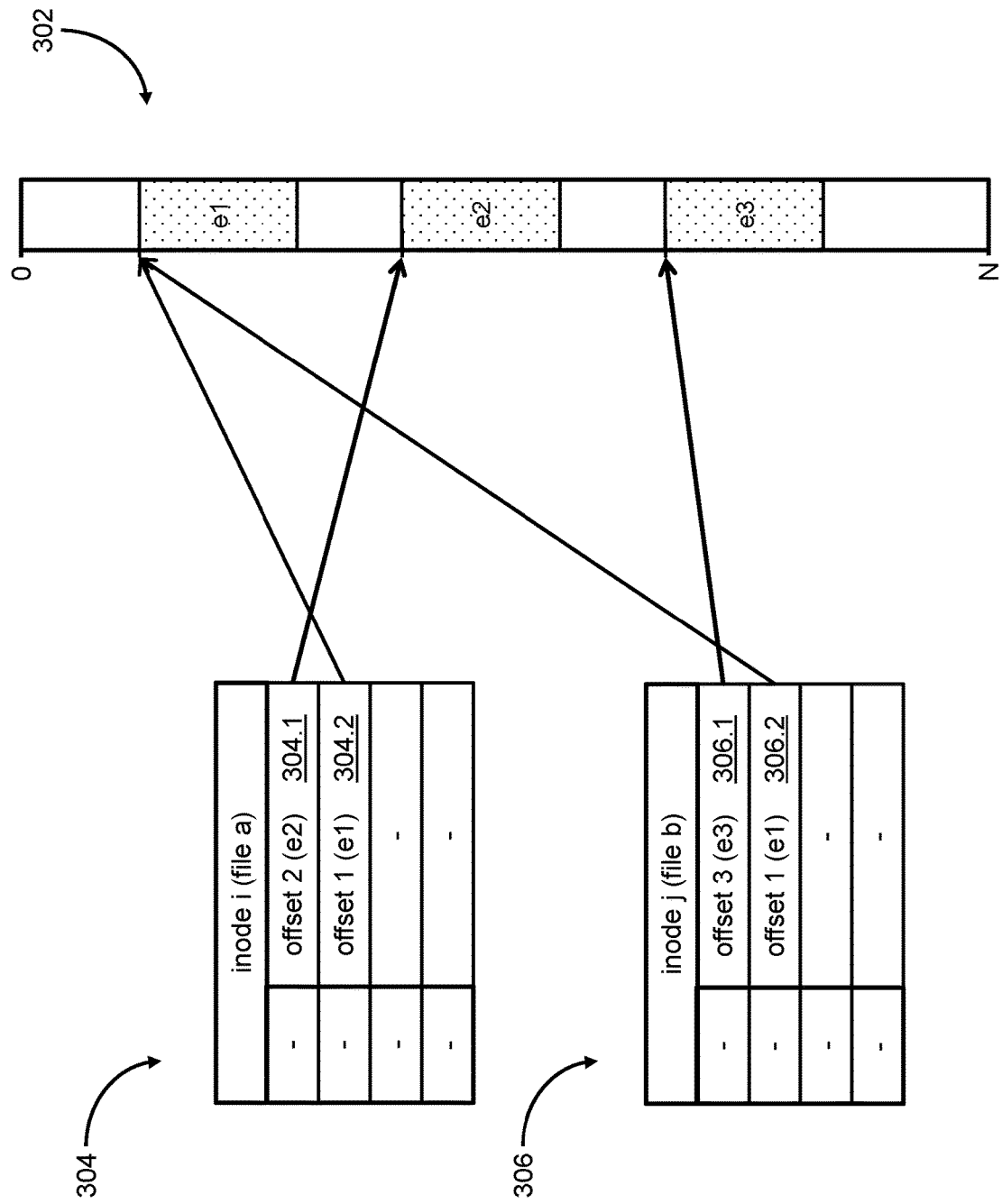
Fig. 3a(3)

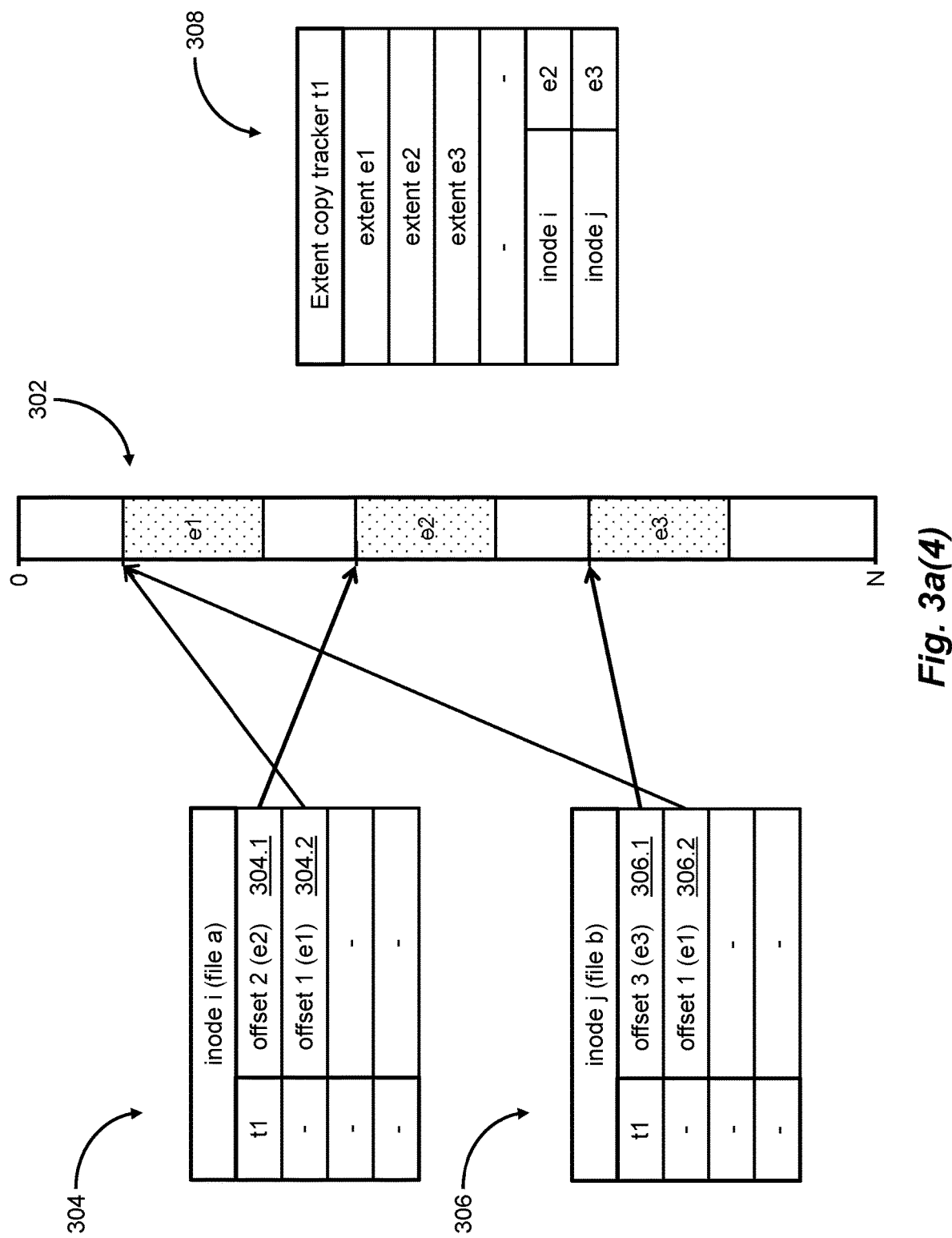
Fig. 3a(4)

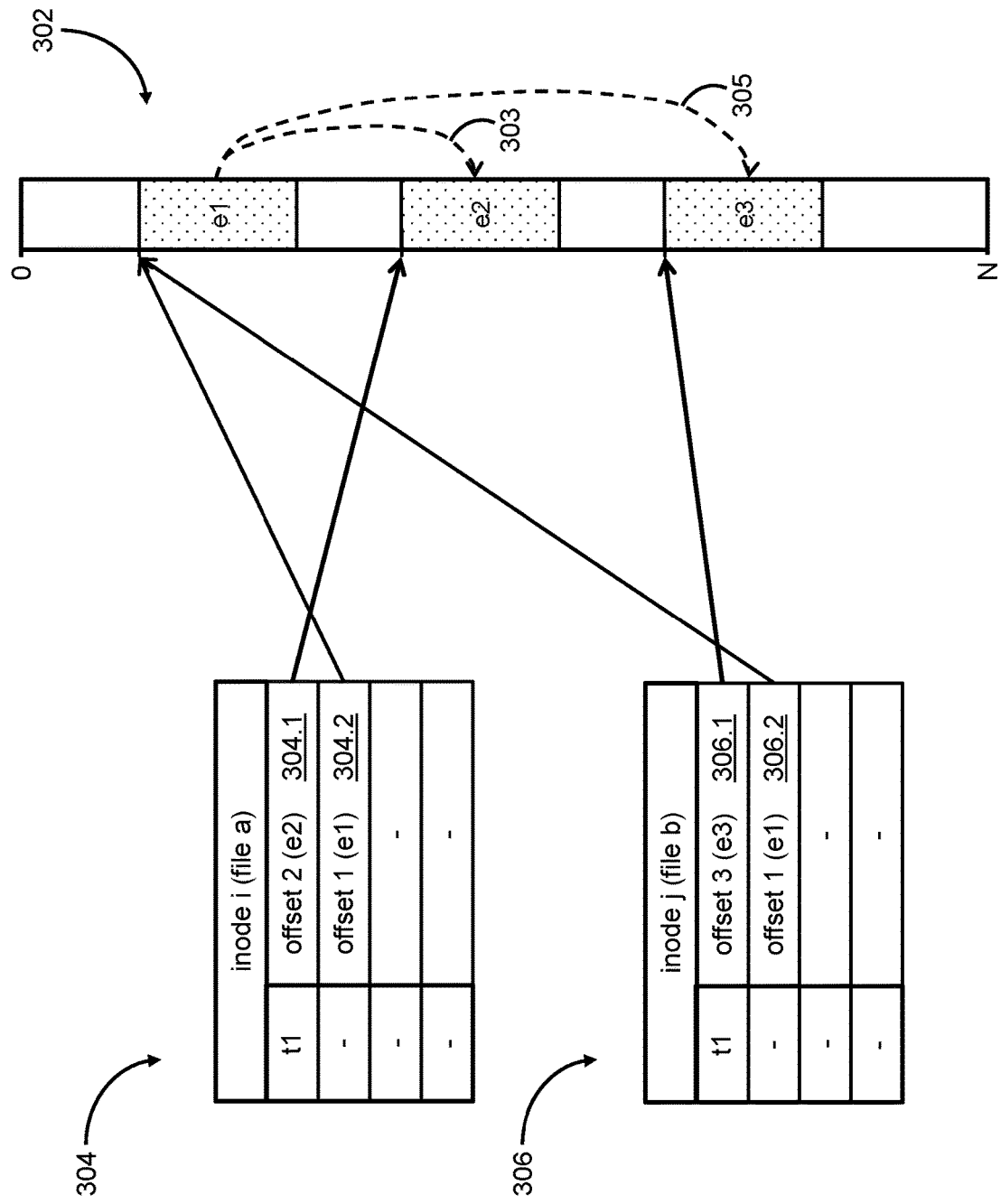
Fig. 3a(5)

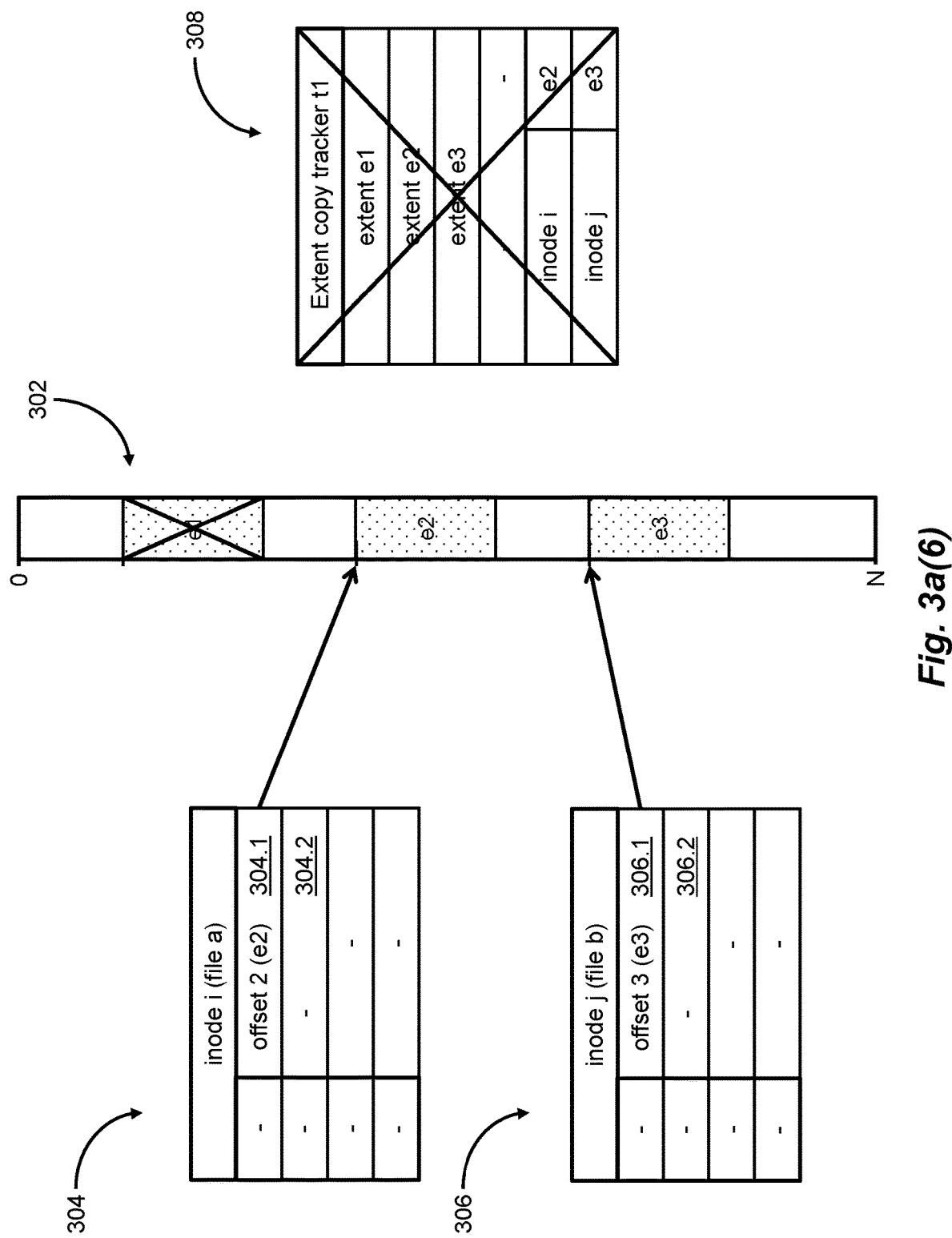
Fig. 3a(6)

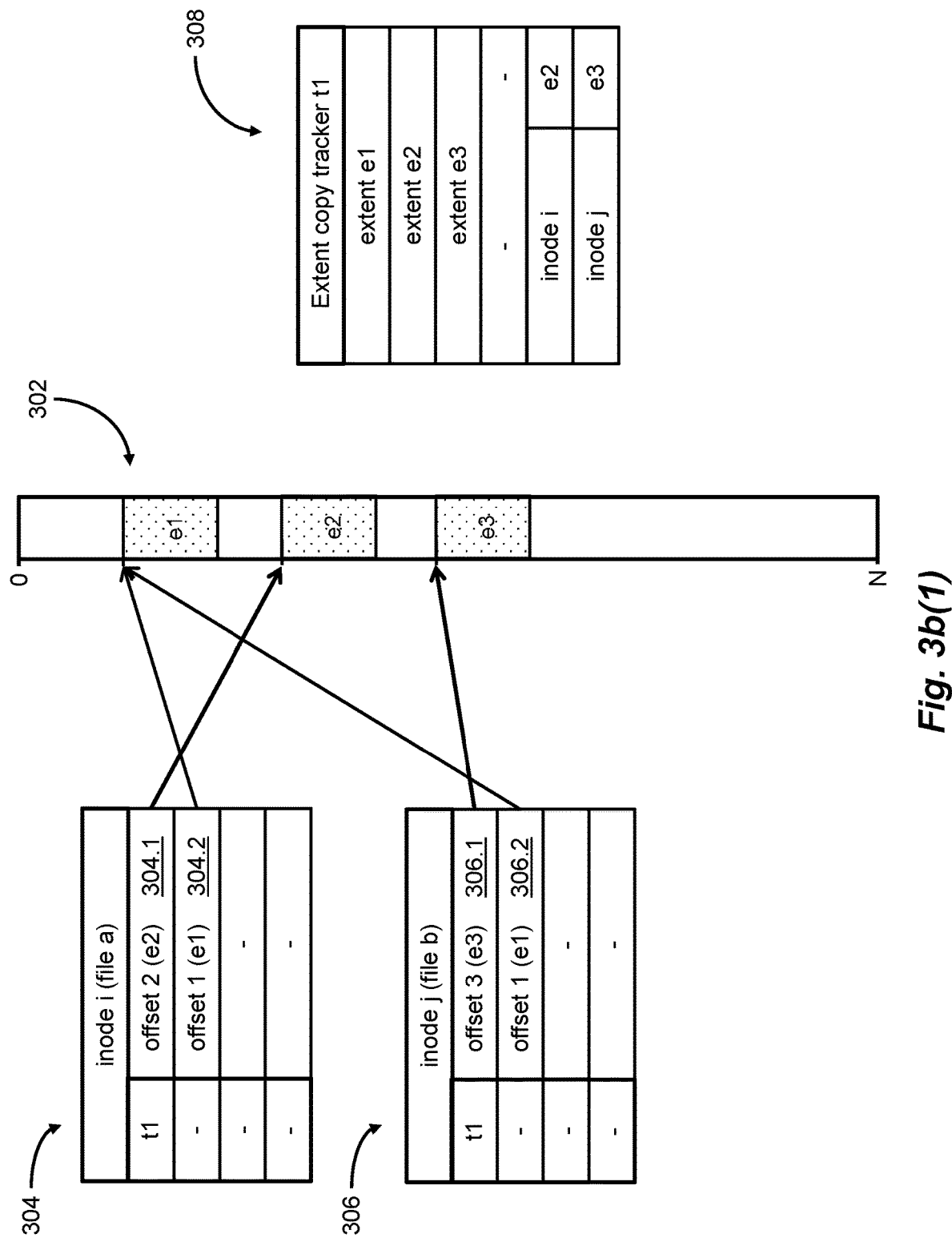
Fig. 3b(1)

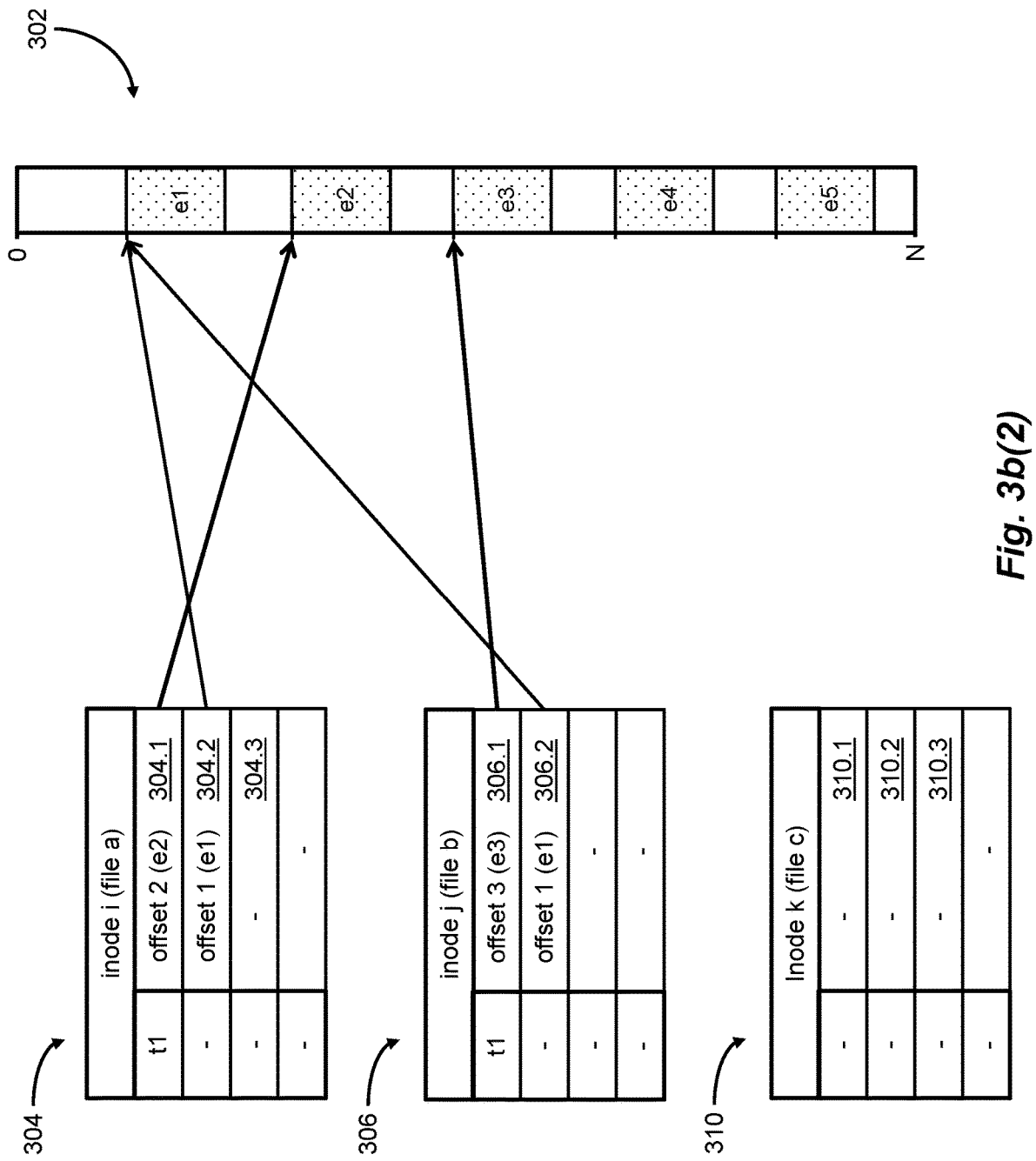
Fig. 3b(2)

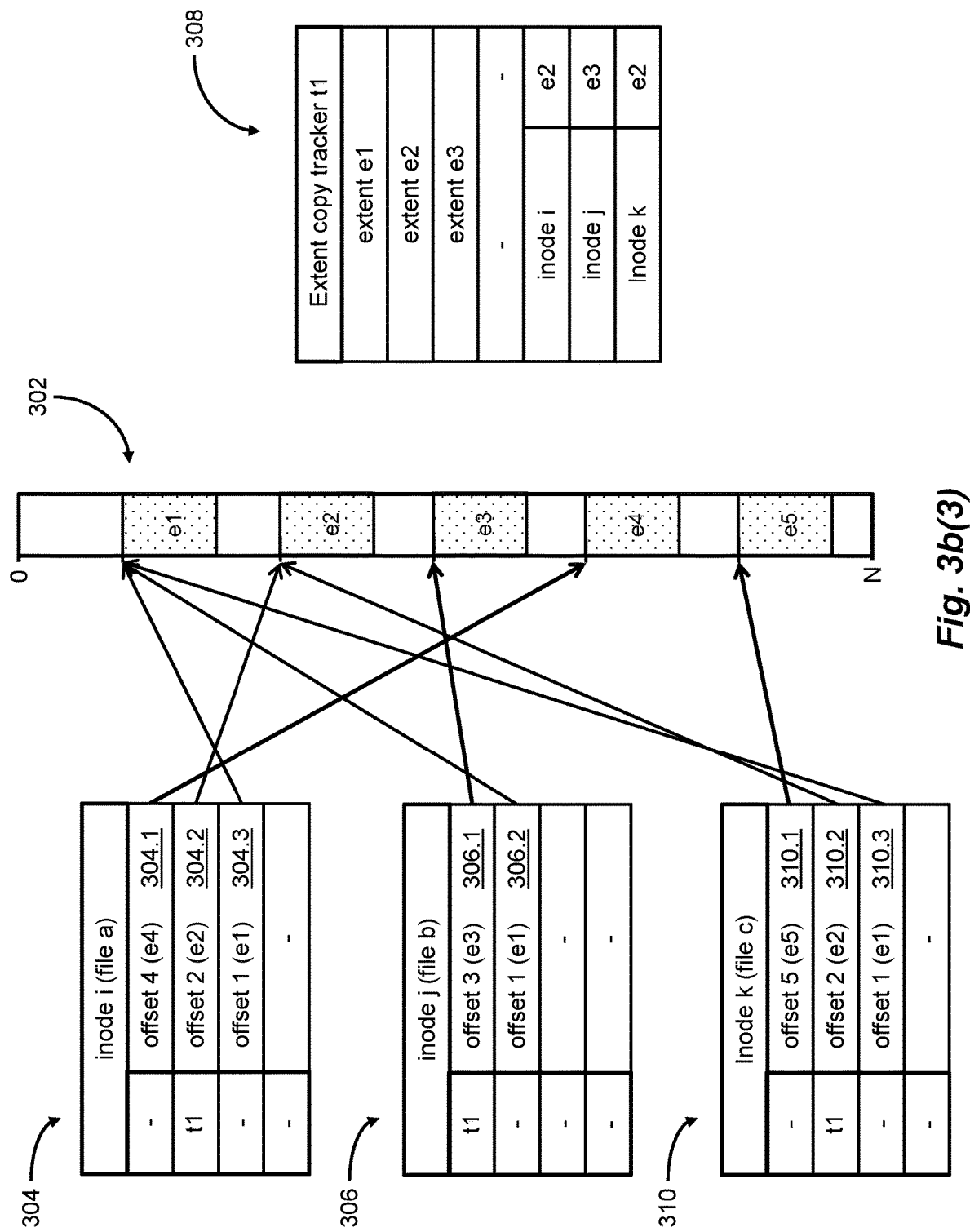
Fig. 3b(3)

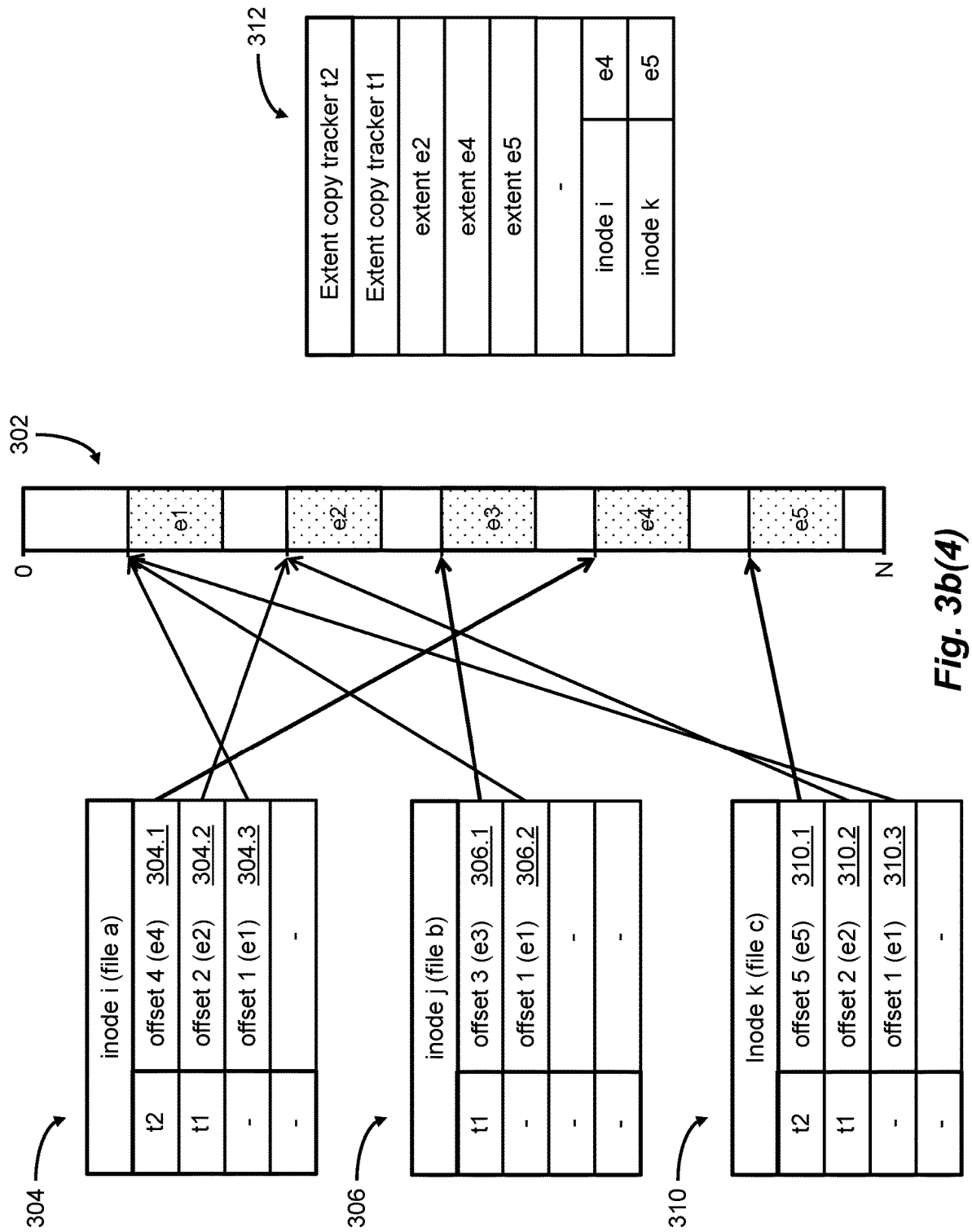
Fig. 3b(4)

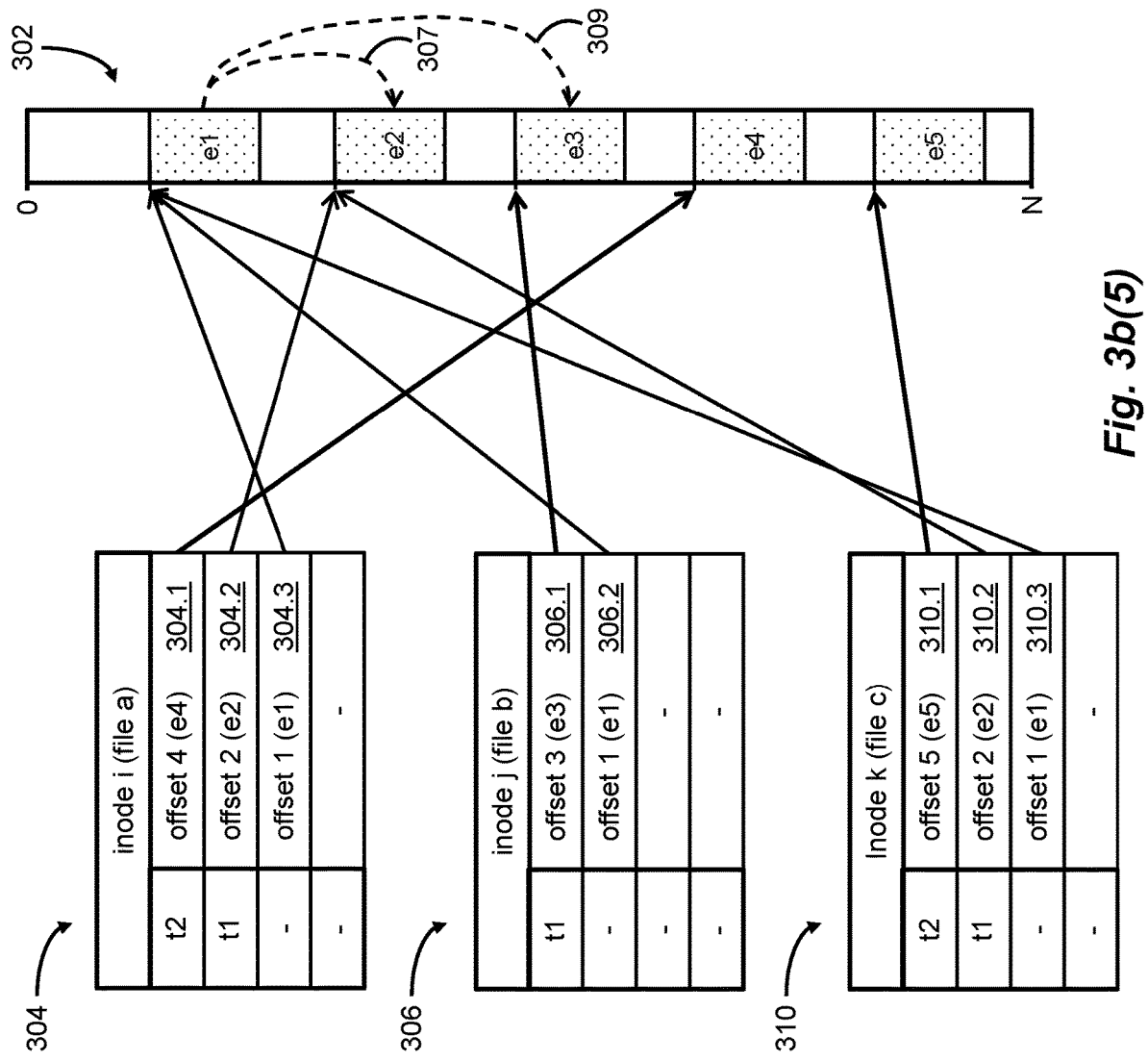
Fig. 3b(5)

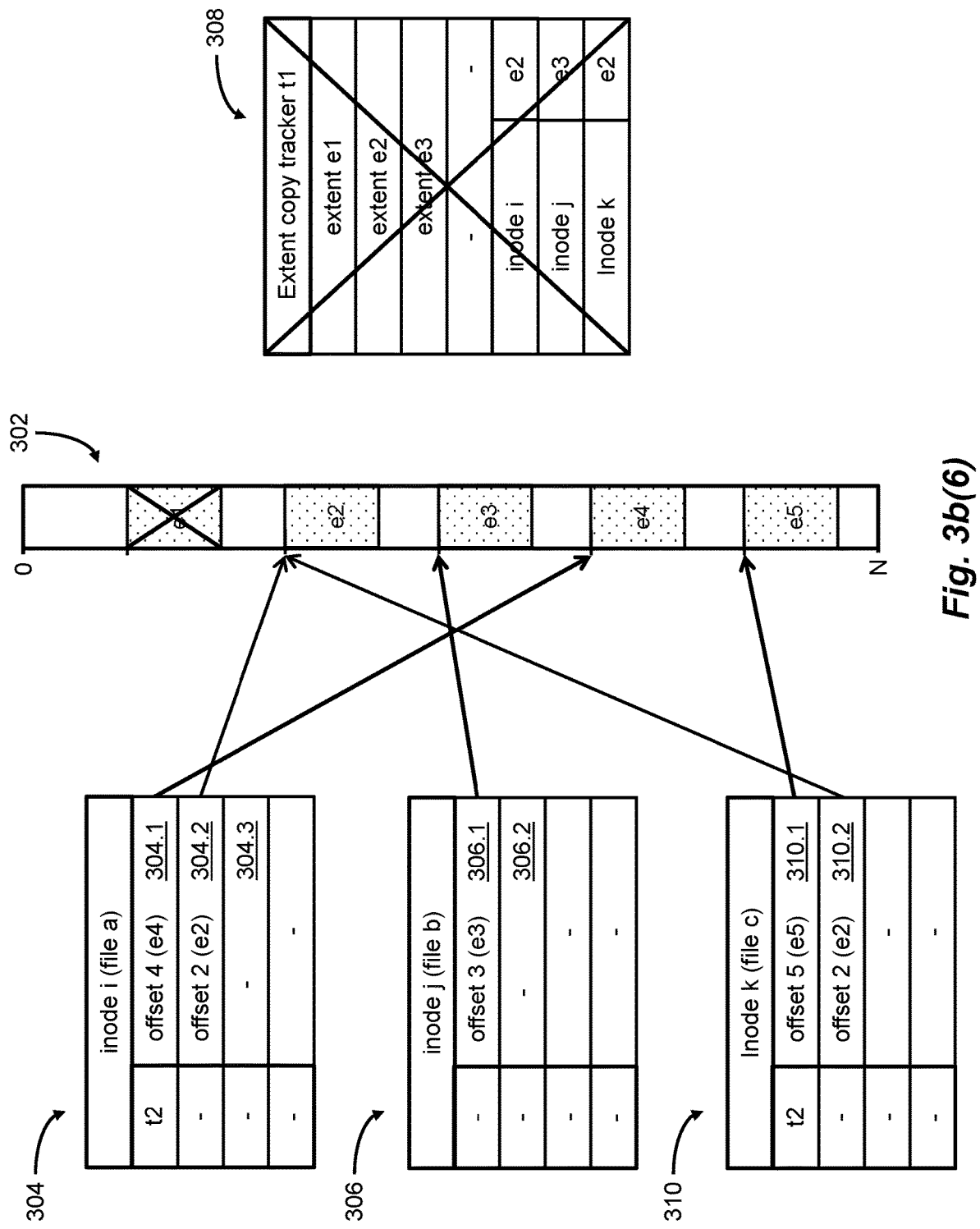
Fig. 3b(6)

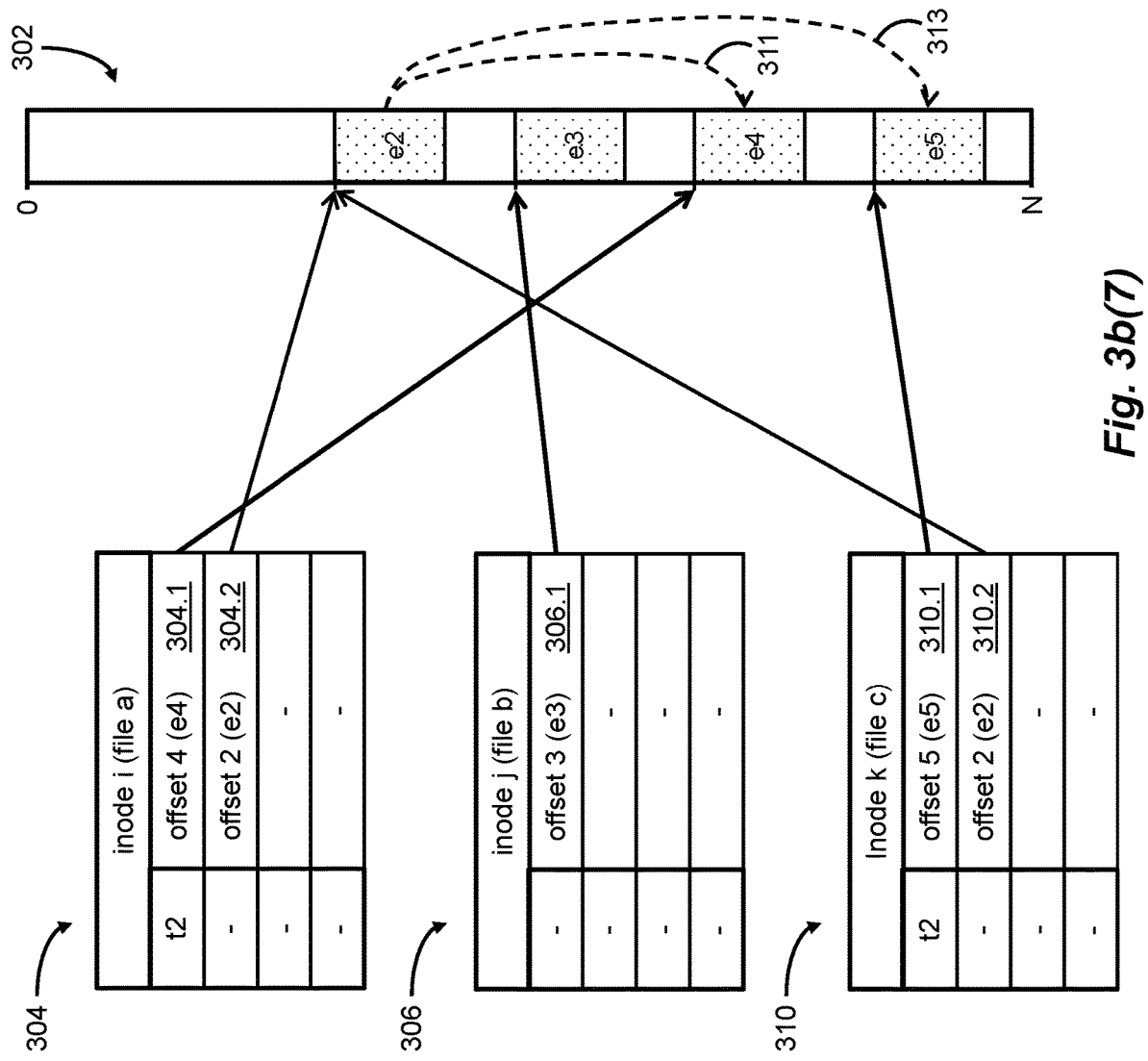
Fig. 3b(7)

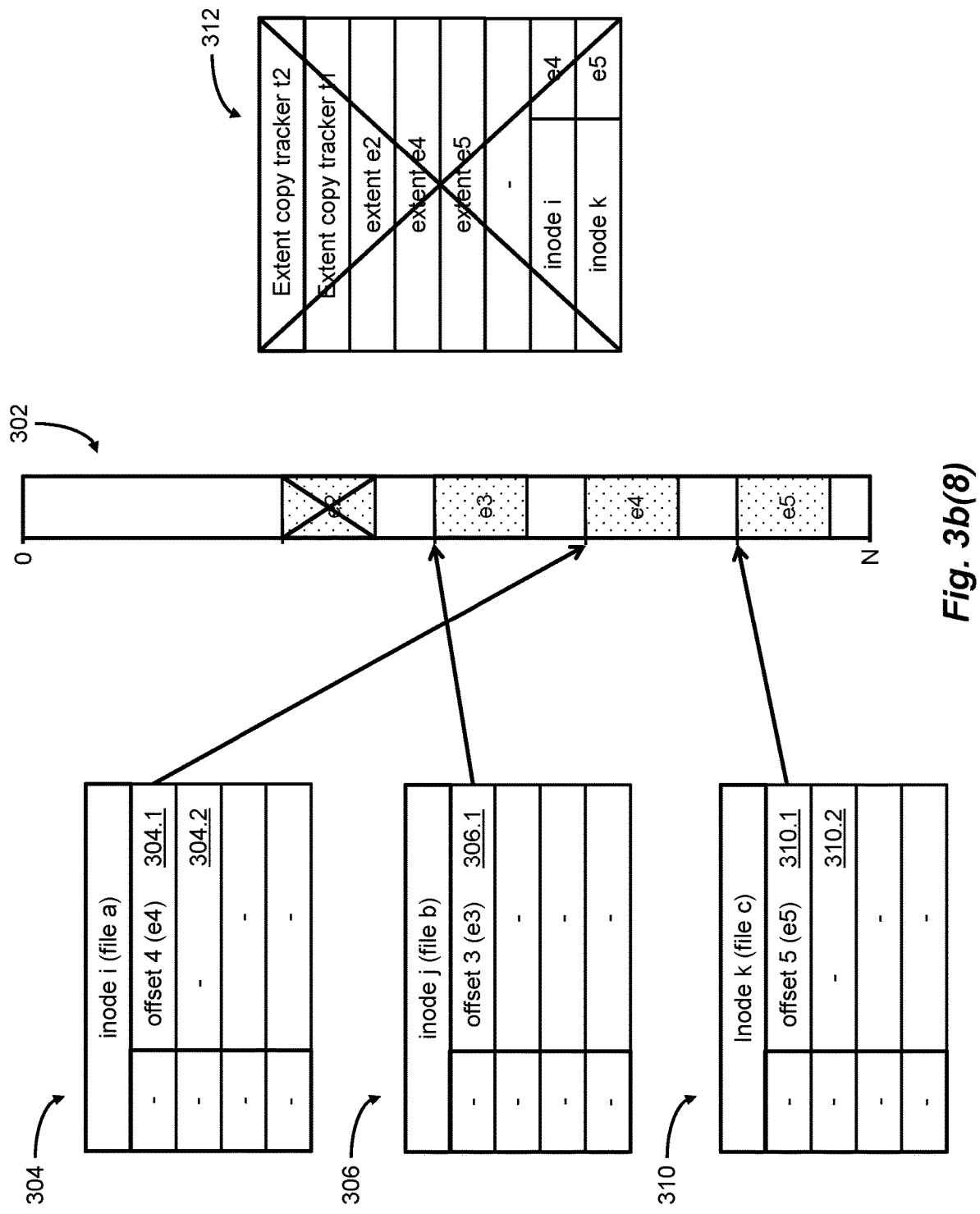
*Fig. 3b(8)*

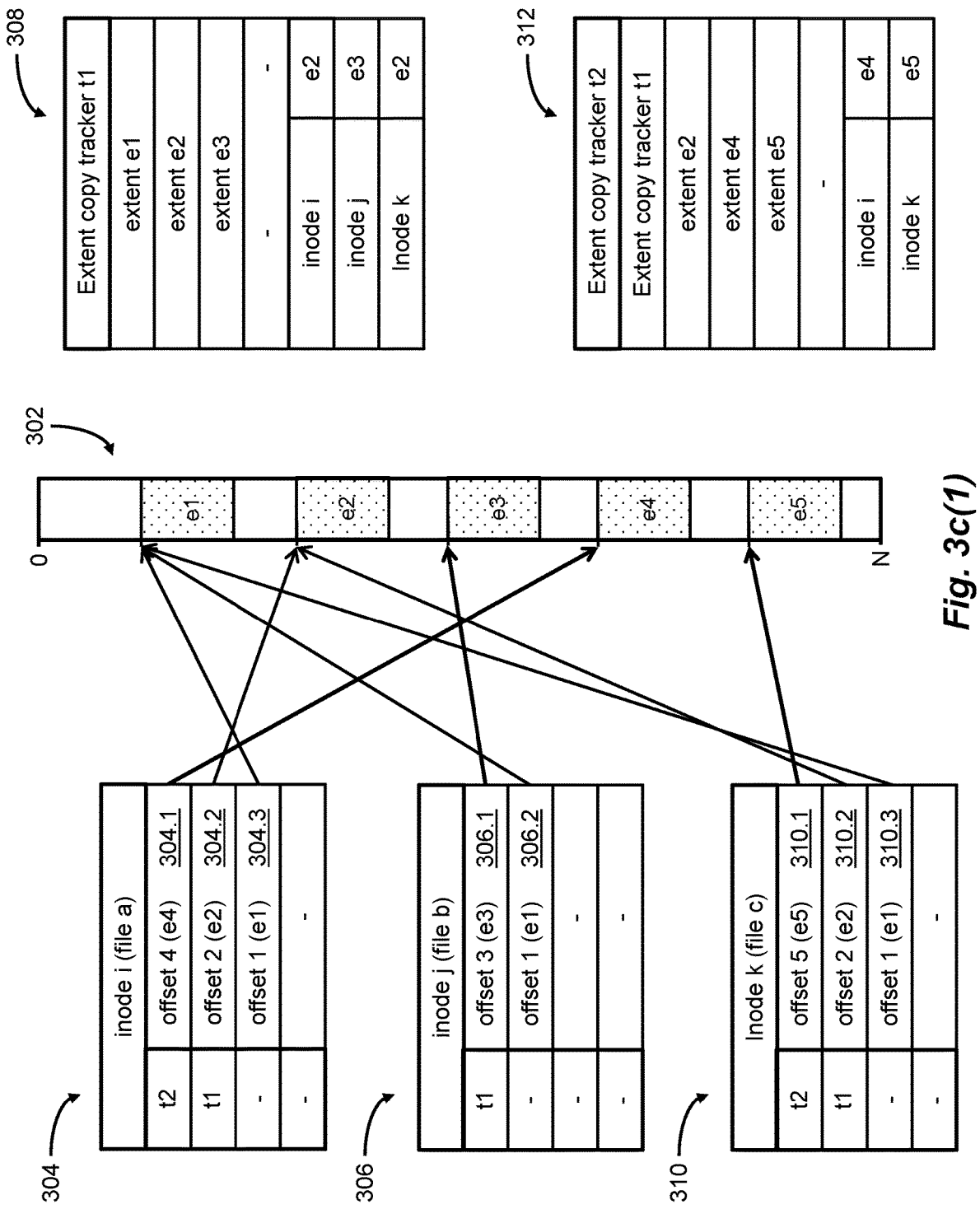
Fig. 3c(1)

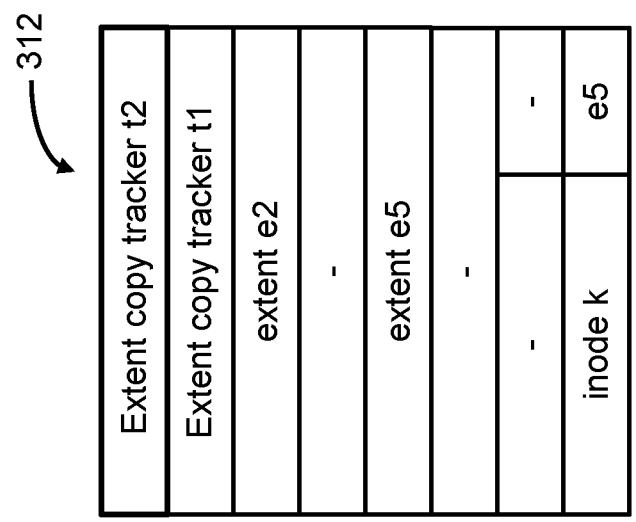
Fig. 3c(2)

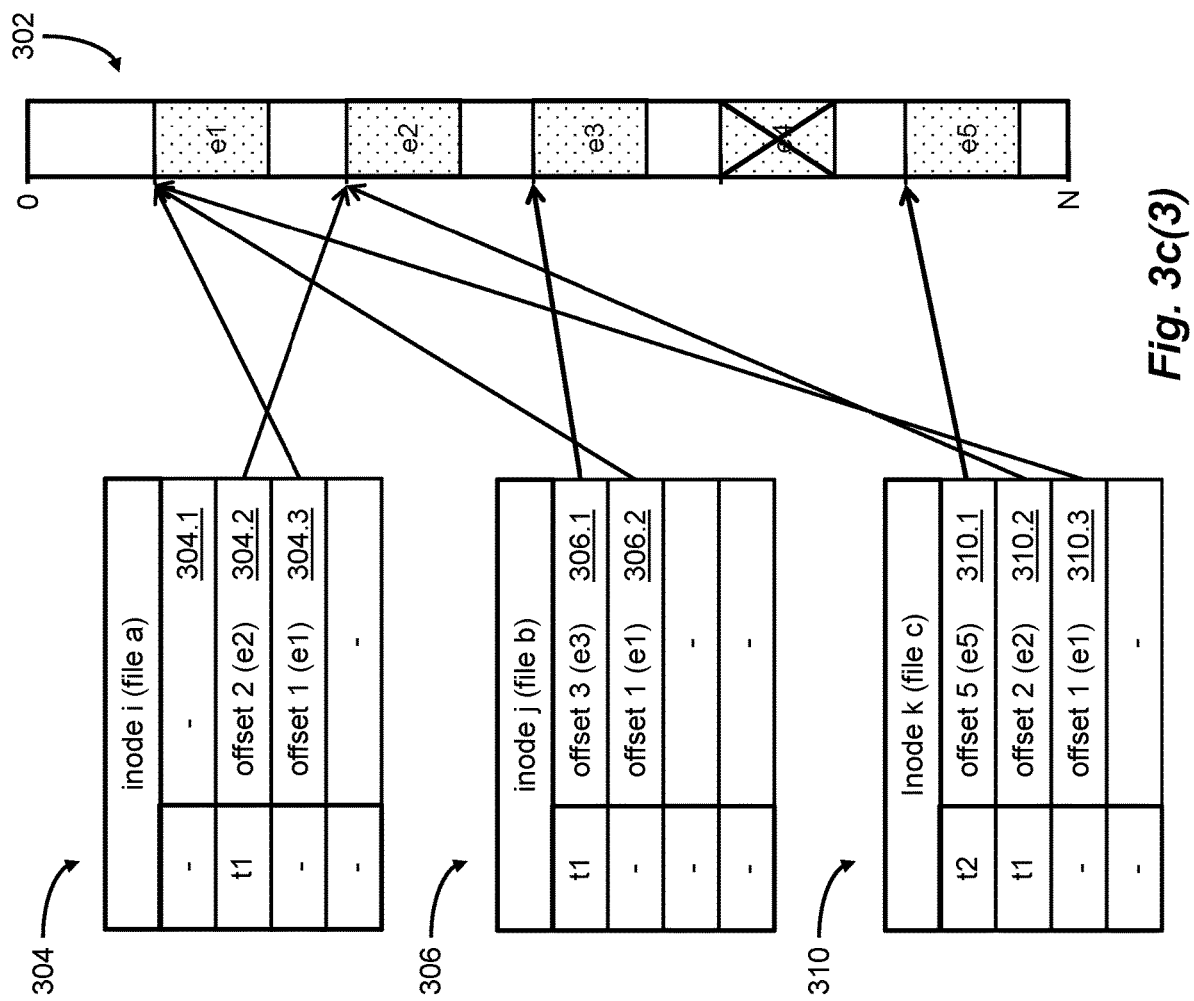
Fig. 3c(3)

Fig. 3c(4)

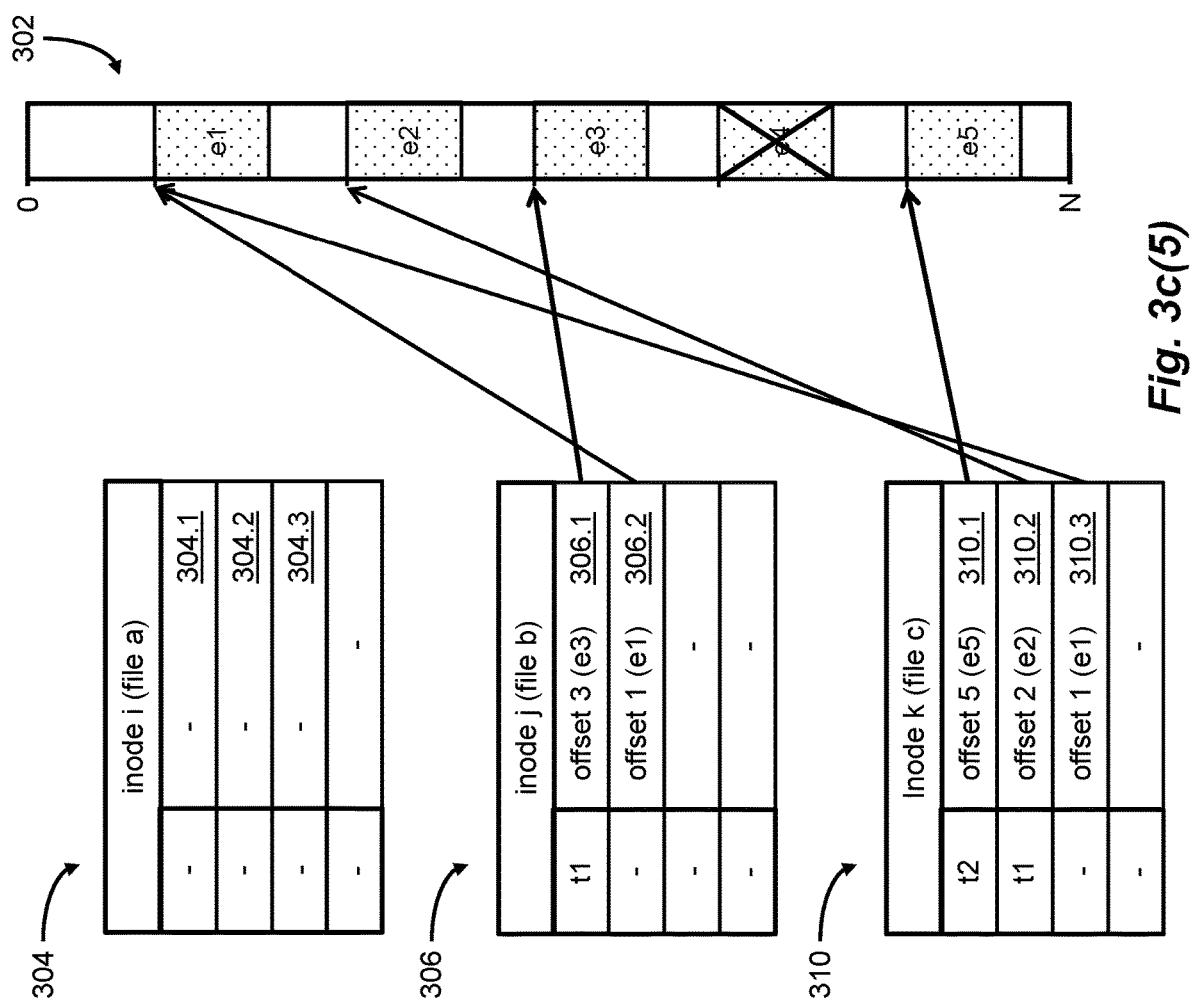
Fig. 3c(5)

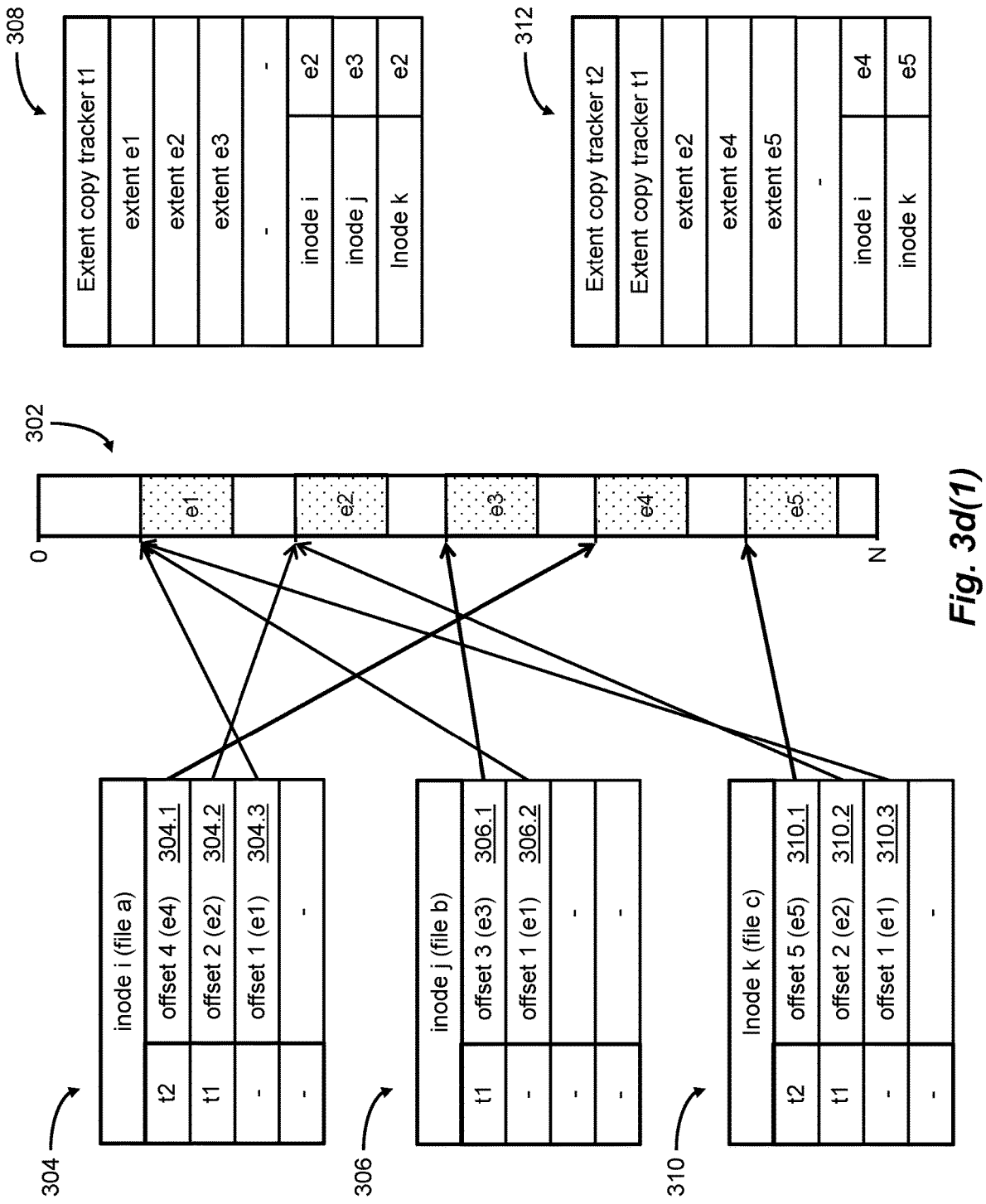
*Fig. 3d(1)*

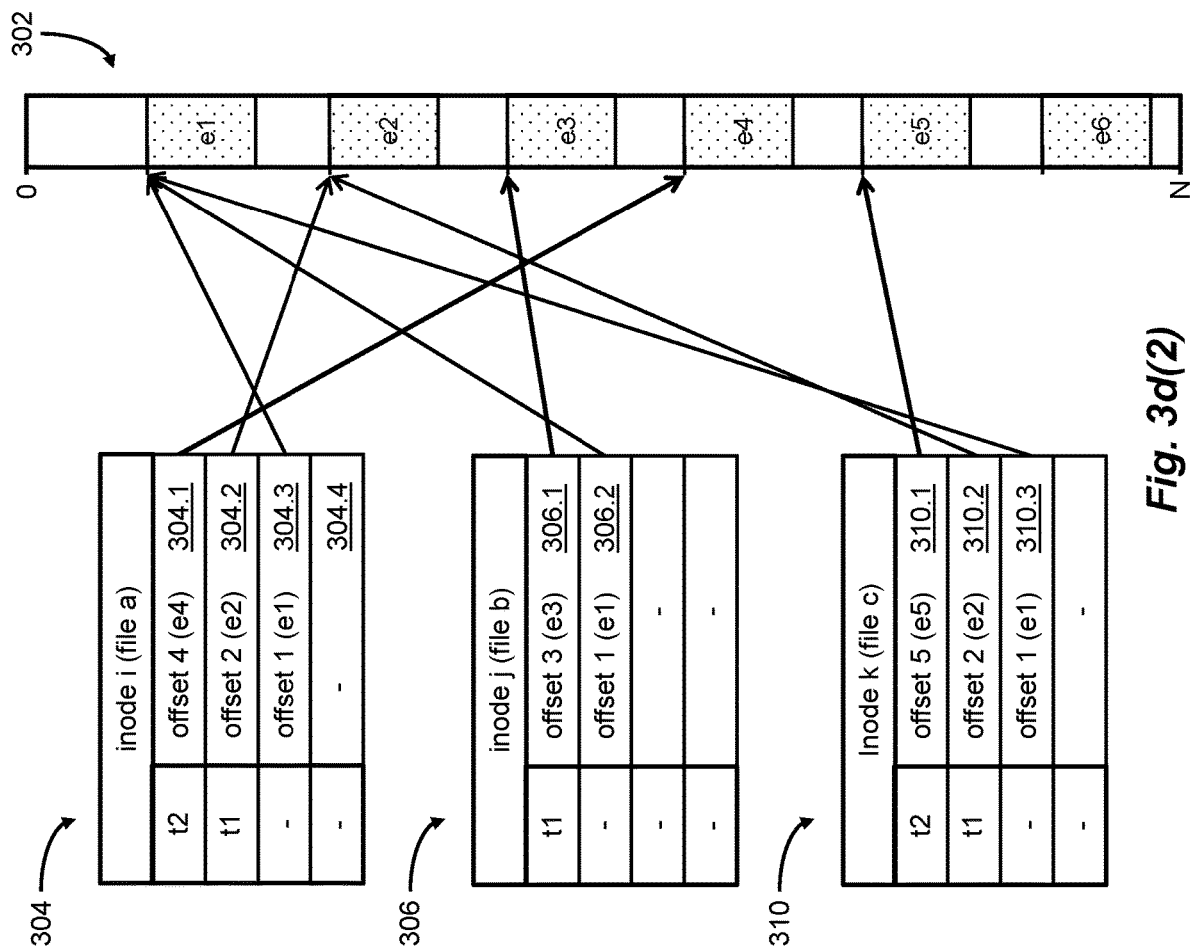
Fig. 3d(2)

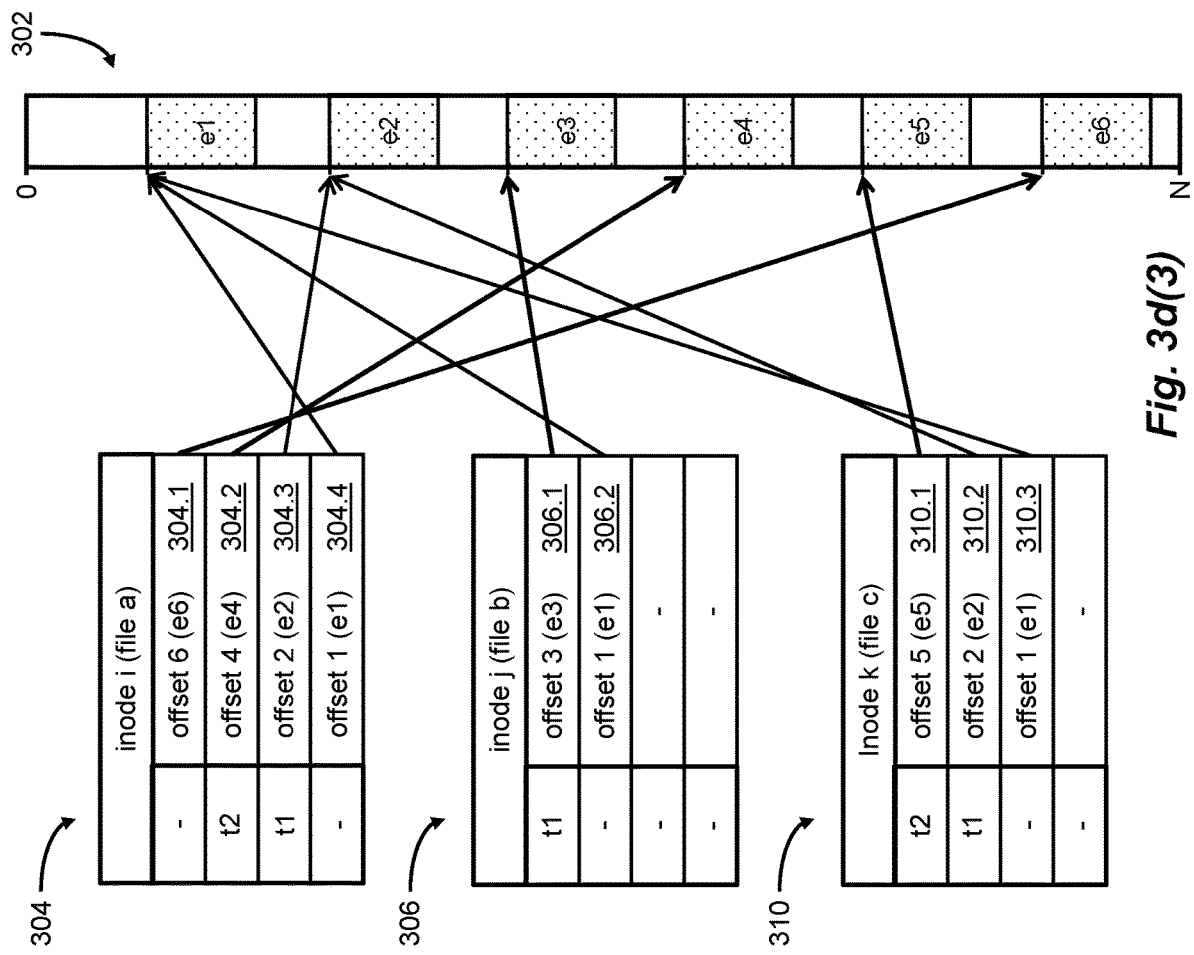
Fig. 3d(3)

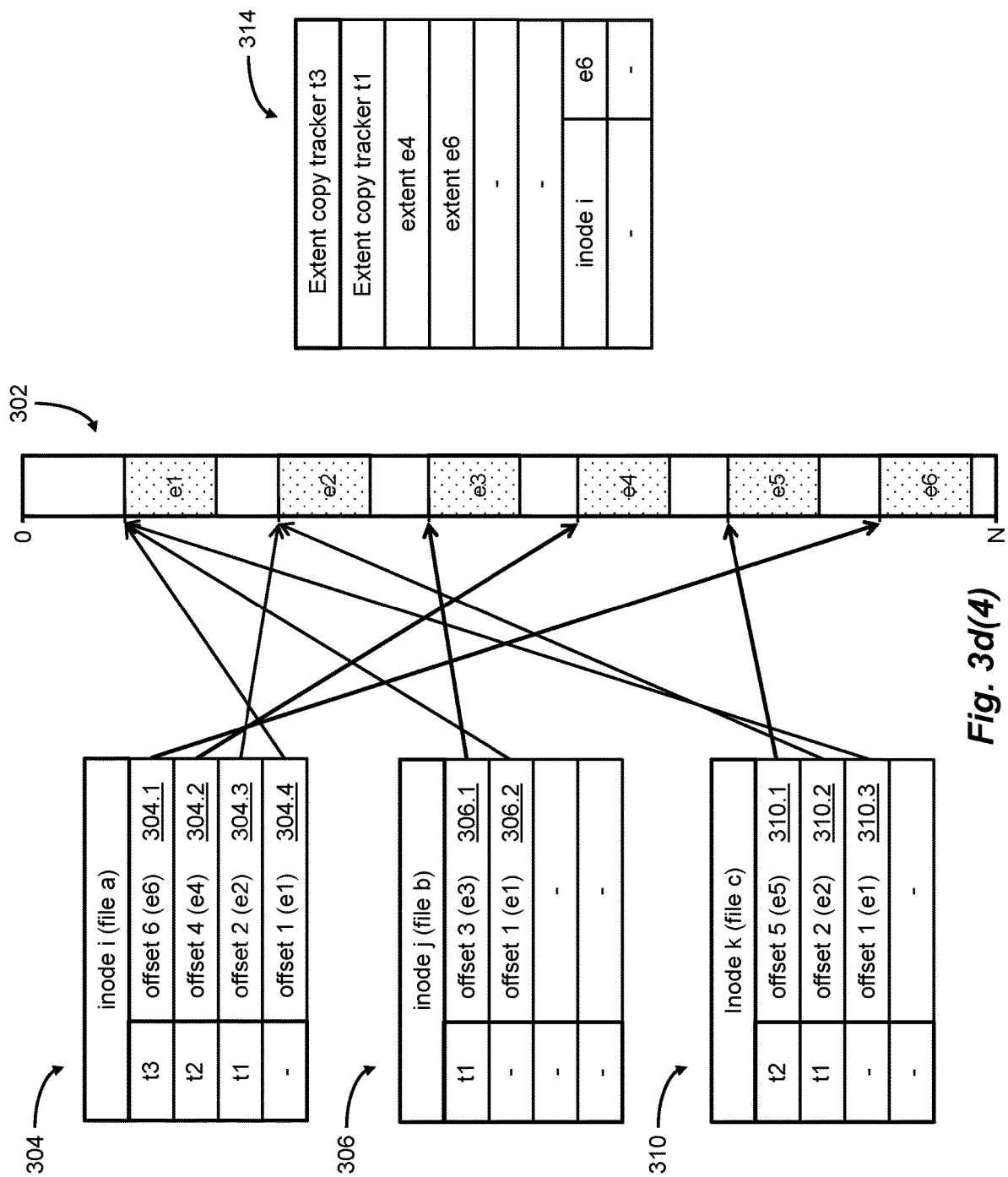
Fig. 3d(4)

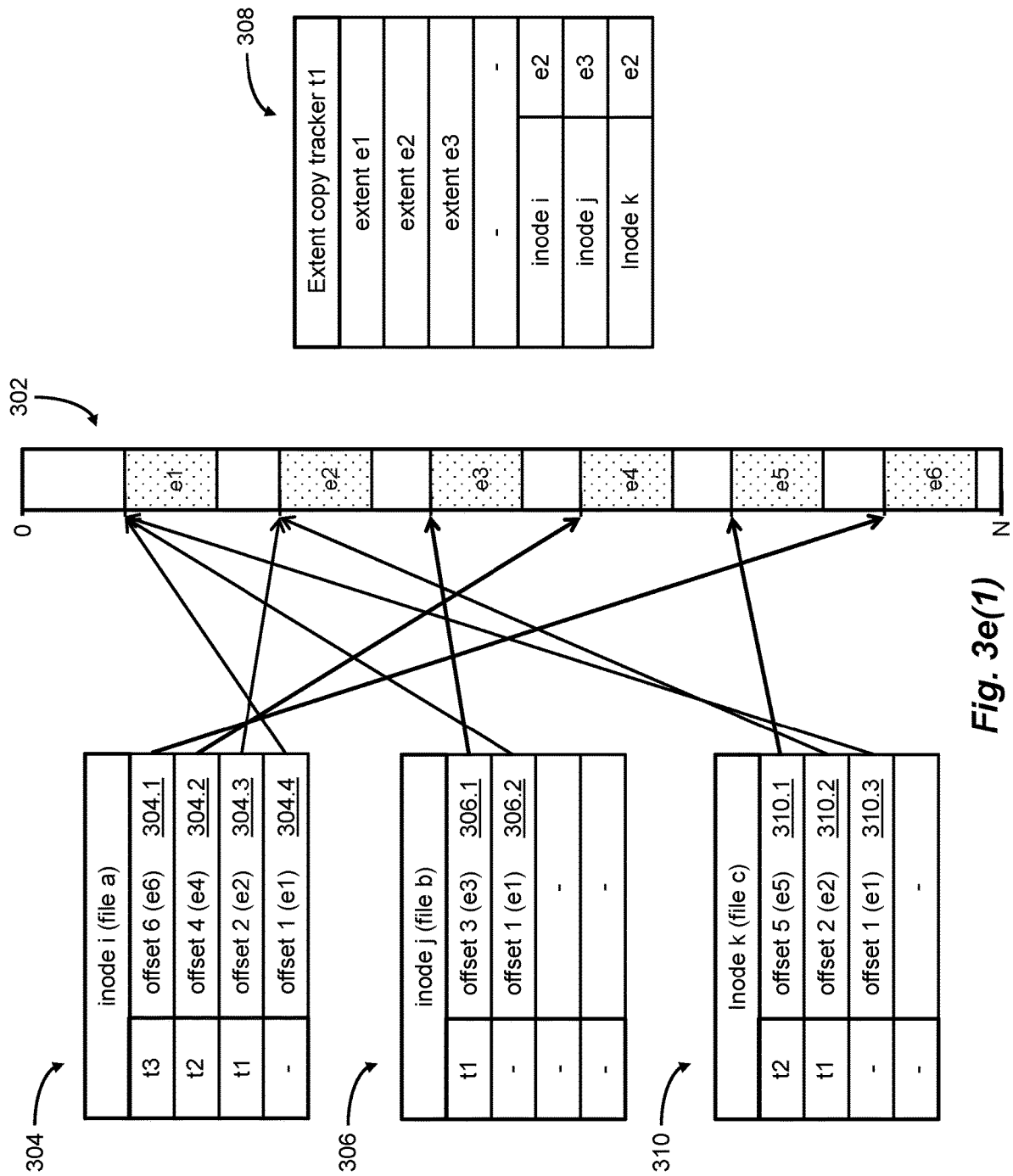
Fig. 3e(1)

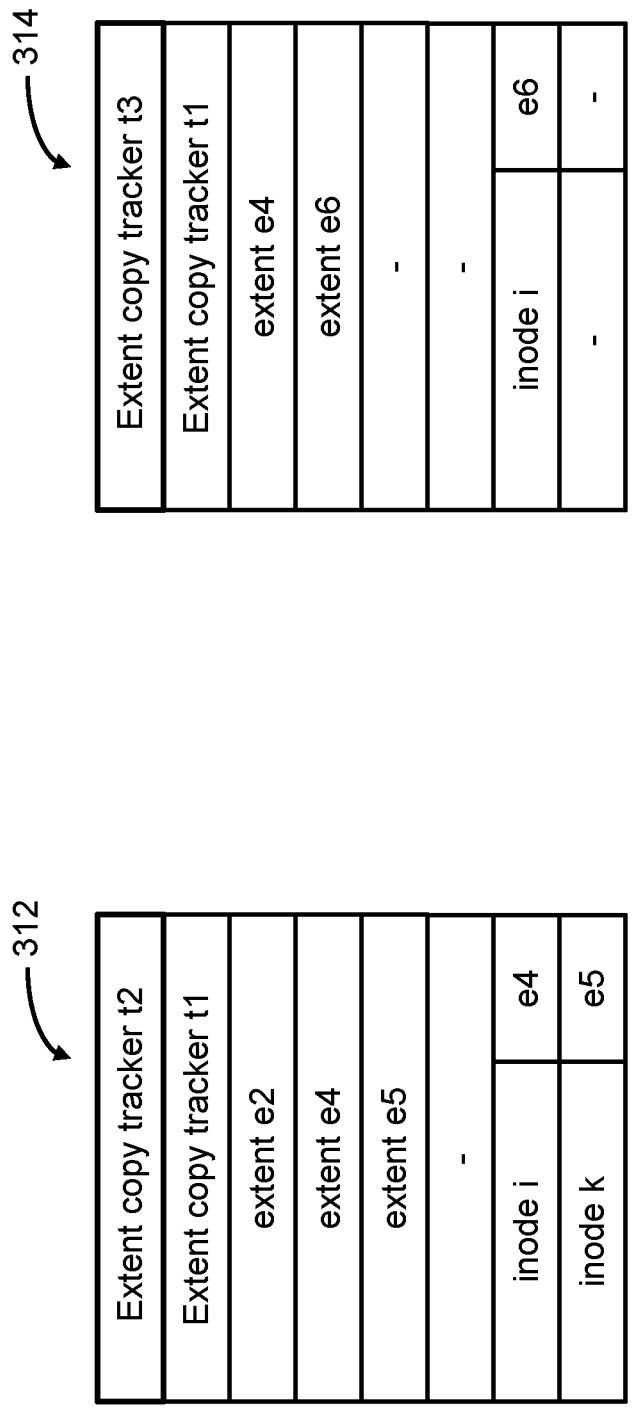
Fig. 3e(1) (Cont.)

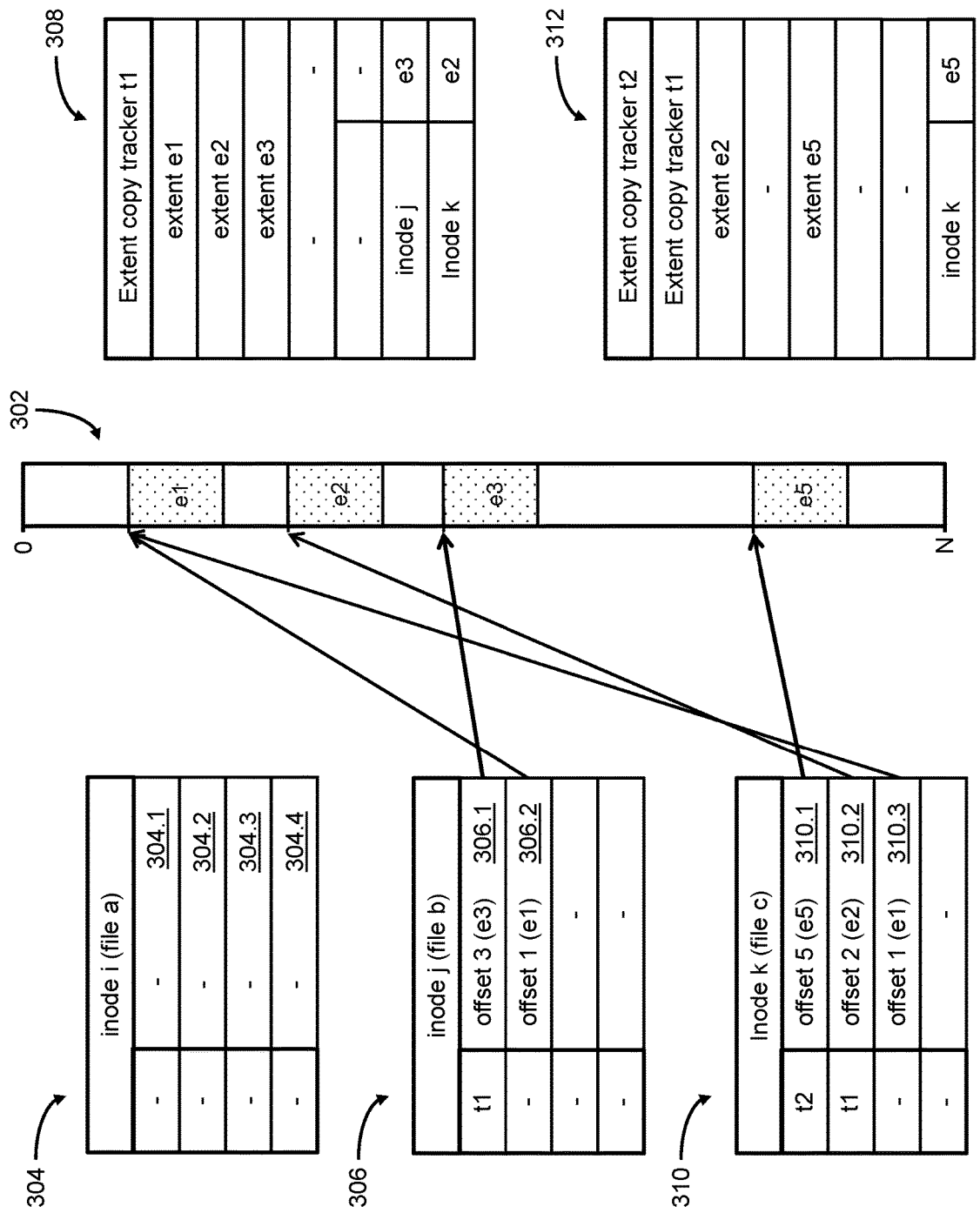
Fig. 3e(2)

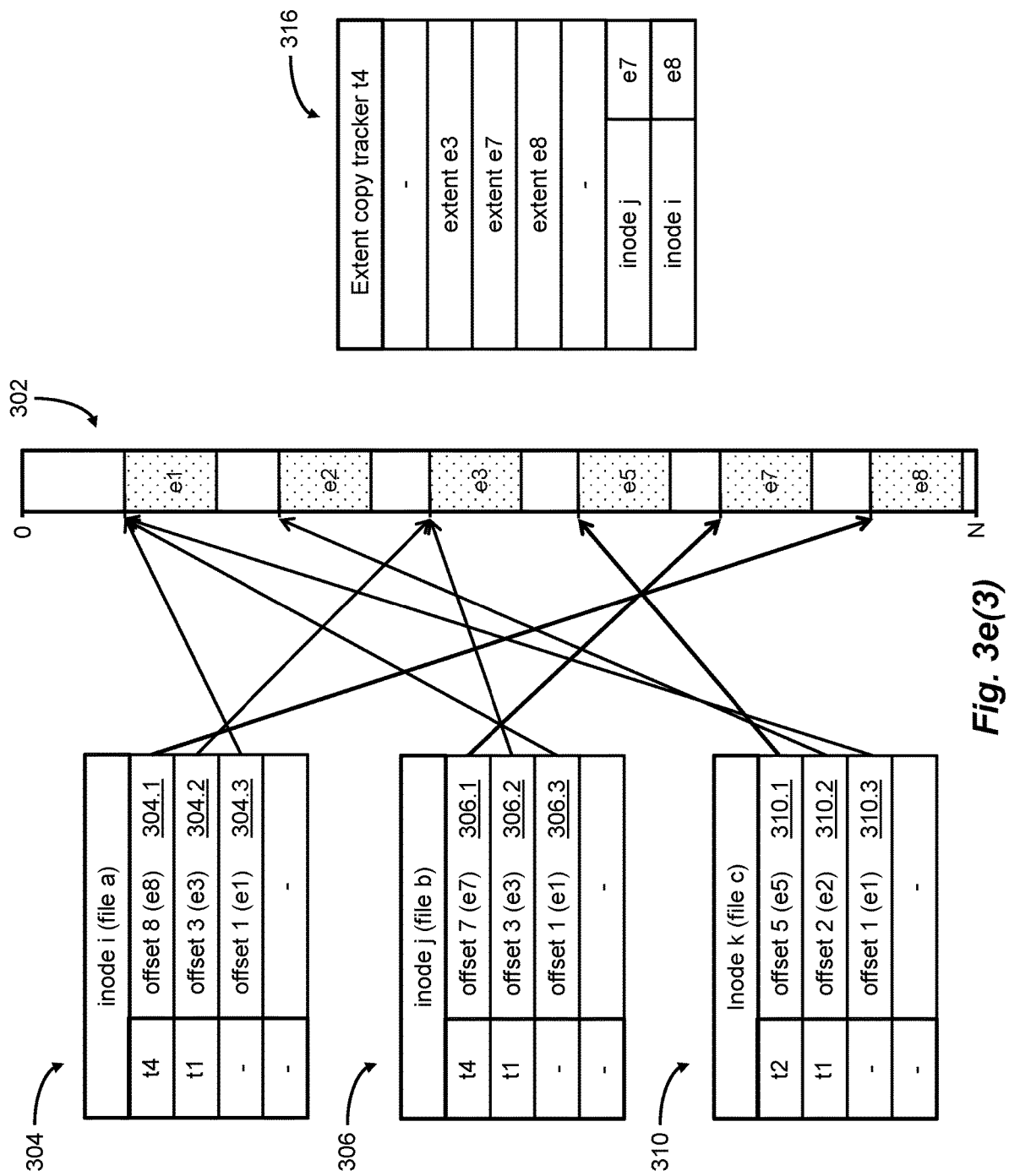
Fig. 3e(3)

FAST OBJECT SNAPSHOT VIA BACKGROUND PROCESSING

BACKGROUND

Conventional data storage systems typically create snapshots of the data storage objects at certain points in time for a variety of purposes, including, but not limited to, backing-up volumes of data, providing data recovery, improving application availability, and reducing data management costs. Such snapshots can be used to record states of the data storage systems (e.g., file storage systems) by creating point-in-time copies of data files, which are typically organized with associated metadata in a logical (or virtual) address space. Such data files can consist of one or more extents of storage space within the logical address space, and the one or more extents can consist of data blocks of the same size or different sizes.

SUMMARY

In such conventional data storage systems, creation of snapshots of data files can include copying the one or more extents that make up the data files from one region(s) of the logical address space to another region(s) of the logical address space. During the creation of the snapshots, existing write data (also referred to herein as "dirty data") stored in cache memory can be incorporated into the snapshots of the respective data files, while input/output (I/O) requests (e.g., writes/reads) from host computers are suspended to avoid incorporating new write data into the snapshots during their creation. The creation of snapshots in such conventional data storage systems can be problematic, however, because mapping operations associated with the copying of the extents (e.g., setting up pointers to the extents, allocating storage space for the data blocks) are typically performed while the I/O requests are suspended, which can result in significant latency in the resumption of the I/O requests from the host computers.

Techniques are disclosed herein for creating snapshots of data storage objects that can perform certain operations (e.g., flushing dirty data, setting up extent pointers, allocating block storage space, etc.) during background (or deferred) processing. The disclosed techniques employ one or more extent copy trackers that can be created during processing of a transaction, while I/O request from host computers are suspended. The extent copy trackers are configured to perform some or all of the certain operations in the background, after the transaction has been committed and/or the processing of the transaction has been completed. By performing such operations during background processing, a processing time required to complete the snapshot transaction is reduced, thereby reducing latency in the resumption of the I/O requests from the host computers.

In certain embodiments, a data storage system includes a memory, a first index node (inode) for a file allocated in the memory, and a first extent for the file allocated in the memory within a logical address space. The first inode includes a first pointer to the first extent. A method of performing one or more snapshot operations during background processing within the data storage system, includes, in a transaction, allocating a second inode in the memory, in which the second inode includes a first pointer to the first extent, allocating a second extent and a third extent in the memory within the logical address space, in which the first inode includes a second pointer to the second extent and the second inode includes a second pointer to the third extent, and creating a tracker object in the memory for performing the background processing after the transaction is committed. In response to the transaction being committed, the tracker object performs the background processing, including at least logically copying data from the first extent to the second extent, logically copying the data from the first extent to the third extent to create a snapshot of the file, deleting the first extent within the logical address space from the memory, removing the first pointer to the first extent from the first inode, removing the first pointer to the first extent from the second inode, and deleting the tracker object from the memory. The snapshot is referenced within the data storage system by the second inode.

In certain further embodiments, a system for performing one or more snapshot operations during background processing includes storage processing circuitry and a memory. A first inode for a file is allocated in the memory, and a first extent for the file is allocated in the memory within a logical address space. The first inode includes a first pointer to the first extent. In a transaction, a second inode is allocated in the memory, in which the second inode includes a first pointer to the first extent, a second extent and a third extent are allocated in the memory within the logical address space, in which the first inode includes a second pointer to the second extent and the second inode includes a second pointer to the third extent, and a tracker object is created in the memory for performing the background processing after the transaction is committed. In response to the transaction being committed, the tracker object performs the background processing, including at least logically copying data from the first extent to the second extent, logically copying the data from the first extent to the third extent to create a snapshot of the file, deleting the first extent within the logical address space from the memory, removing the first pointer to the first extent from the first inode, removing the first pointer to the first extent from the second inode, and deleting the tracker object from the memory. The snapshot is referenced within the system by the second inode.

Other features, functions, and aspects of the invention will be evident from the Detailed Description that follows.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views.

FIG. 2a is a diagram of an exemplary logical (virtual) address space implemented within the data storage system of FIG. 1, the logical address space accommodating a plurality of extents associated with at least one data file;

FIG. 2b is a diagram of an exemplary index node (inode) for the data file of FIG. 2a, the inode including a plurality of offsets specifying locations of the plurality of extents, respectively, within the logical address space of FIG. 2a;

FIGS. 3a(1)-3a(6) are diagrams illustrating exemplary creation of a first snapshot of a data file within the data storage system of FIG. 1;

FIGS. 3b(1)-3b(8) are diagrams illustrating exemplary creation of a second snapshot of the data file of FIGS. 3a(1)-3a(6);

FIGS. 3c(1)-3c(5) are diagrams illustrating exemplary deletion of the data file of FIGS. 3a(1)-3a(6);

FIGS. 3d(1)-3d(4) are diagrams illustrating exemplary change of a size of the data file of FIGS. 3a(1)-3a(6);

FIGS. 3e(1)-3e(3) are diagrams illustrating exemplary reversion of the data file of FIGS. 3a(1)-3a(6) from a snapshot of the data file.

DETAILED DESCRIPTION

Techniques are disclosed herein for creating snapshots of data storage objects that can perform certain operations (e.g., flushing dirty data, setting up extent pointers, allocating block storage space, etc.) during background (or deferred) processing. The disclosed techniques employ one or more extent copy trackers that can be created during processing of a transaction, while I/O request from host computers are suspended. The extent copy trackers are configured to perform some or all of the certain operations in the background, after the transaction has been committed and/or the processing of the transaction has been completed. By performing such operations during background processing, a processing time required to complete the snapshot transaction is reduced, thereby reducing latency in the resumption of the I/O requests from the host computers.

Figure 1:
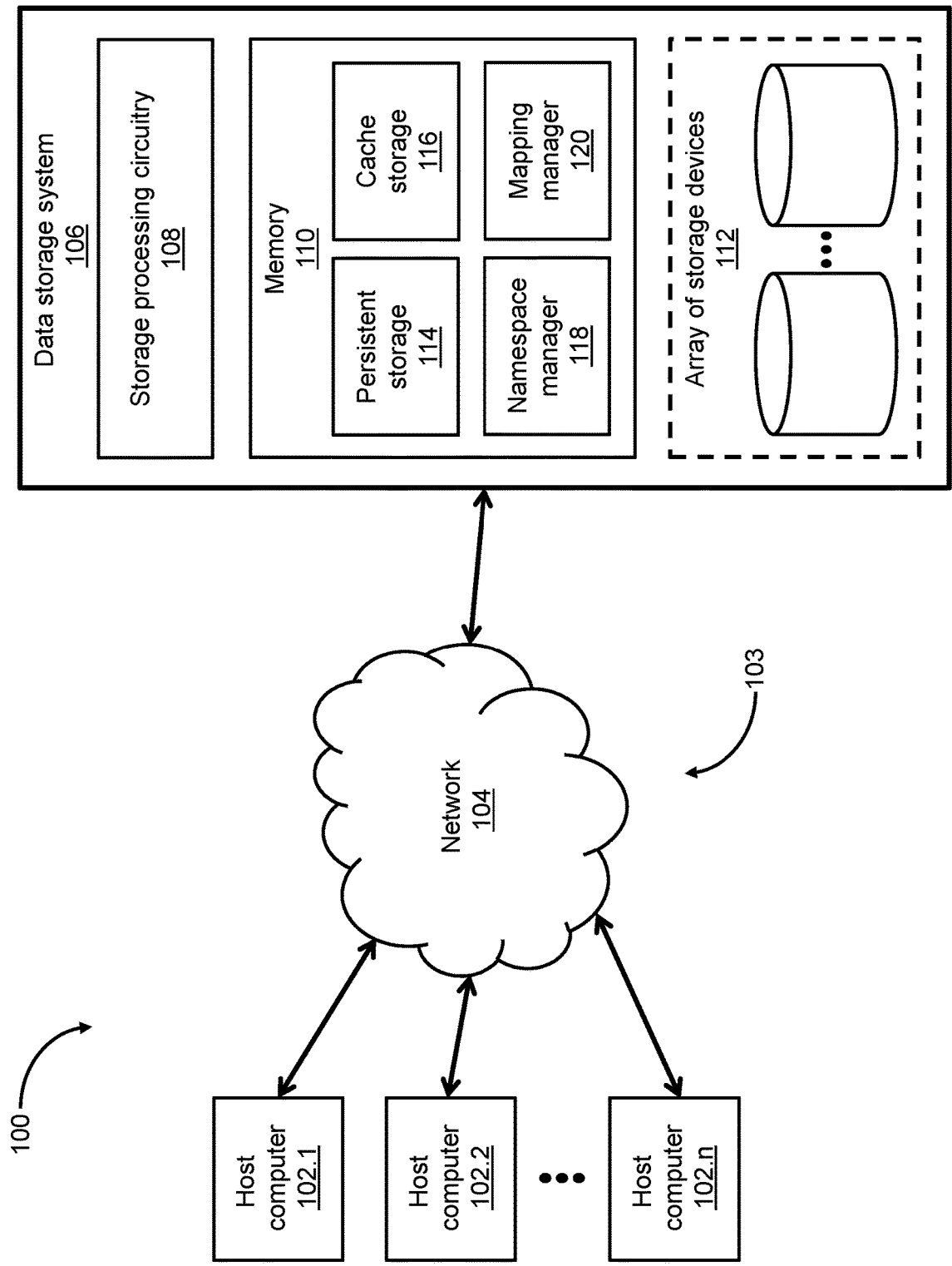
FIG. 1 is a block diagram of an exemplary environment in which an exemplary data storage system configured to perform certain snapshot operations during background processing can be employed.

FIG. 1 depicts an illustrative embodiment of an exemplary data storage environment 100, in which an exemplary data storage system 106 configured to perform certain snapshot operations during background processing can be employed. As shown in FIG. 1, the data storage environment 100 includes a plurality of host computers 102.1, 102.2, . . . , 102.n communicably coupled to the data storage system 106 by a communications medium 103 that includes a network 104. For example, each of the plurality of host computers 102.1, 102.2, . . . , 102.n can be configured as a web server computer, a file server computer, an email server computer, an enterprise server computer, and/or any other suitable computer or computerized device for providing input/output (I/O) requests (e.g., small computer system interface (SCSI) commands) to the data storage system 106 over the communications medium 103. Such I/O requests provided by the plurality of host computers 102.1, 102.2, . . . , 102.n can direct the data storage system 106 to store and/or retrieve blocks of data from virtual volumes on behalf of the respective host computers 102.1, 102.2, . . . , 102.n.

The communications medium 103 can be configured to interconnect the plurality of host computers 102.1, 102.2, . . . , 102.n and the data storage system 106 to enable them to communicate and exchange electronic signals. As shown in FIG. 1, at least a portion of the communications medium 103 is illustrated as a "cloud" to indicate that the communications medium 103 can have a variety of different topologies including, but not limited to, backbone, hub-and-spoke, loop, irregular, or any suitable combination thereof. The communications medium 103 can also include, but is not limited to, copper based data communications devices and cabling, fiber optic devices and cabling, wireless devices, or any suitable combination thereof. In addition, the communications medium 103 can be configured to support storage area network (SAN) based communications, local area network (LAN) based communications, cellular communications, wide area network (WAN) based communications, distributed infrastructure communications, and/or any other suitable communications.

As further shown in FIG. 1, the data storage system 106 can include storage processing circuitry 108, a memory 110, and an array of storage devices 112. The memory 110 can include persistent memory storage 114 (e.g., flash memory, magnetic memory) and non-persistent cache memory storage 116 (e.g., dynamic random access memory (DRAM), static random access memory (SRAM)), and accommodate a variety of software constructs including, but not limited to, operating system code and data, data storage system code and data, and snapshot creation code and data. The memory 110 can further include a namespace manager 118 and a mapping manager 120. The namespace manager 118 is configured to maintain a namespace of objects (e.g., index nodes (inodes), data files) that are accessible to the plurality of host computers 102.1, 102.2, . . . , 102.n. For example, each data file can be made up of one or more extents e1, e2, e3, . . . (see FIG. 2a), each of which can correspond to a sub-range within an exemplary logical (virtual) address space 202 (see also FIG. 2a). Further, sub-ranges corresponding to the respective extents e1, e2, e3, . . . can each be a range of contiguous logical addresses spanning some or all of a LUN (logical storage unit) or a VVOL (virtual machine volume). The mapping manager 120 is configured to map logical addresses maintained by the namespace manager 118 to corresponding redundant array of independent disk (RAID) addresses, which, in turn, are mapped to corresponding locations in the array of storage devices 112. The storage processing circuitry 108 can include one or more physical storage processors or engines, data movers, director boards, blades, I/O modules, storage drive controllers, switches, and/or any other suitable computer hardware or combination thereof. For example, the storage processing circuitry 108 can process the I/O requests from the plurality of host computers 102.1, 102.2, . . . , 102.n, and store host data in a RAID environment implemented by the array of storage devices 112.

Figures 2A, 2B:
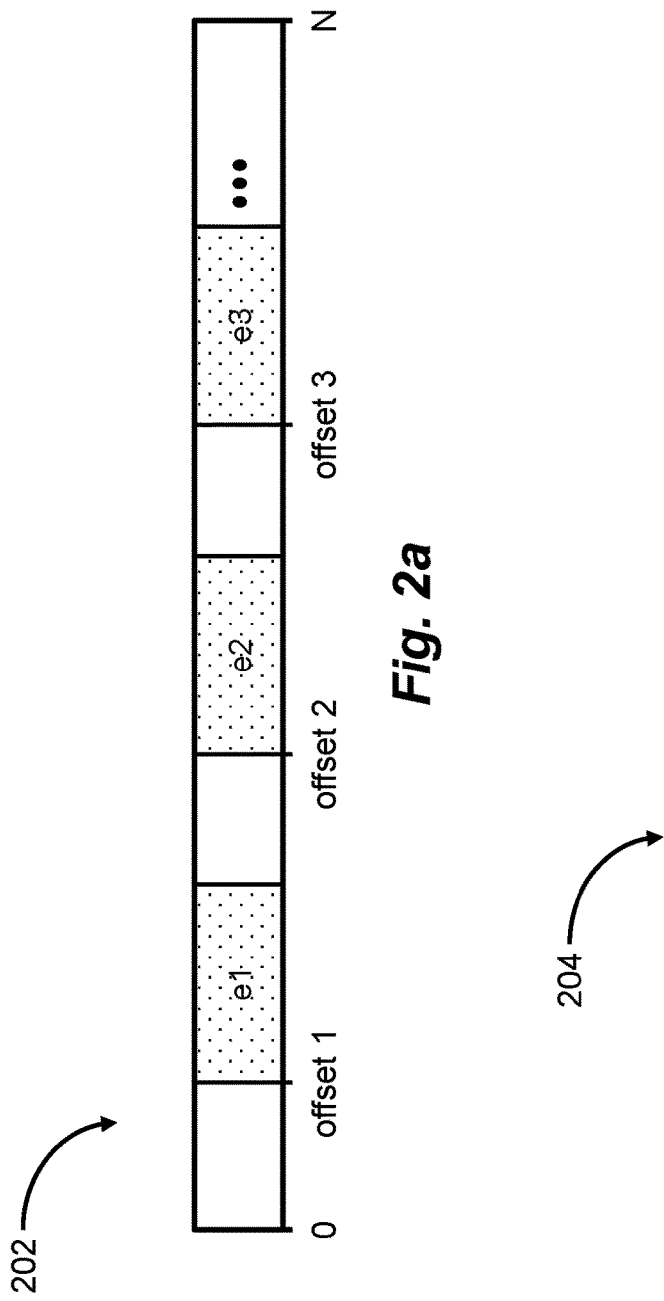

During operation of the data storage system 106, the storage processing circuitry 108 can create one or more snapshots of a data file by copying one or more extents that make up the data file from one region(s) of the logical address space 202 to another region(s) of the logical address space 202. FIG. 2a depicts the logical address space 202, which can be implemented within the memory 110 of the data storage system 106 (see FIG. 1). As shown in FIG. 2a, the logical address space 202 can range from "0" to "N" bytes, which can be equal to N petabytes (PB), N exabytes (EX), or any other suitable (large) number of bytes. Further, the logical address space 202 can accommodate the plurality of extents e1, e2, e3, . . . , locations of which can be specified with reference to corresponding offsets "1", "2", "3", . . . from 0 within the range of the logical address space 202. For example, a location of the extent e1 can be specified with reference to the offset 1 from 0 within the range of the logical address space 202. Likewise, a location of the extent e2 can be specified with reference to the offset 2 from 0 within the range of the logical address space 202, and a location of the extent e3 can be specified with reference to the offset 3 from 0 within the range of the logical address space 202. FIG. 2b depicts an exemplary inode 204 for a data file (e.g., file "a"). For example, if the file "a" were made up of the plurality of extents e1, e2, e3, . . . located within the logical address space 202, then the inode 204 could be configured to include, for the respective extents e1, e2, e3, . . . , a list of at least the offset 1 204.1, the offset 2 204.2, the offset 3 204.3, . . . from 0 within the range of the logical address space 202. The offset 1 (e1) 204.1, the offset 2 (e2) 204.2, and the offset 3 (e3) 204.3 listed in the inode 204 serve as pointers to the extent e1, the extent e2, and the extent e3, respectively, within the logical address space 202.

The operation of the data storage system 106 for performing certain snapshot operations during background processing will be further understood with reference to the following illustrative examples, as well as FIGS. 3a(1)-3a(6), 3b(1)-3b(8), 3c(1)-3c(5), 3d(1)-3d(4), and 3e(1)-3e(3). In the following examples, both inodes and extents can be allocated in the memory 110 by the storage processing circuitry 108 using the namespace manager 118. For example, the inodes can each be allocated in the persistent storage 114 of the memory 110, and the extents can each be allocated in the persistent storage 114 and/or the cache storage 116 of the memory 110. Further, copy operations involving the inodes and/or the extents can be initiated to the mapping manager 120 by the storage processing circuitry 108 using the namespace manager 118. In addition, manipulations of the inodes, as well creation and/or deletion of one or more software and/or hardware constructs referred to herein as "extent copy tracker(s)", can be performed by the storage processing circuitry 108 in association with the memory 110.

In a first example, as described herein with reference to FIGS. 3a(1)-3a(6), a snapshot of a data file (e.g., file "a") is created within the data storage system 106 (see FIG. 1) in a transaction, while performing certain operations during background processing. With reference to FIG. 3a(1), an inode "i" 304 for the file "a" is allocated in the memory 110, and an extent e1 for the file "a" is also allocated in the memory 110 within the logical address space 302. The inode "i" 304 includes an offset array having at least offset entry positions 304.1, 304.2, 304.3. The offset array contains, in its offset entry position 304.1, an offset "1" from 0 within a range (e.g., 0 to N) of the logical address space 302. In this first example, the file "a" is made up of the extent e1, and the offset 1 in the offset entry position 304.1 serves as a pointer to the extent e1 within the logical address space 302.

With reference to FIG. 3a(2), an inode "j" 306 for a file "b" is allocated in the memory 110, and one or more new extents e2 and e3 are also allocated in the memory 110 within the logical address space 302. The inode "i" 306 includes an offset array having at least offset entry positions 306.1, 306.2. As shown in FIG. 3a(3), once the new extents e2 and e3 are allocated within the logical address space 302, the offset 1 contained in the offset array of the inode "i" 304 is moved from the offset entry position 304.1 to the offset entry position 304.2, as well as added to the offset entry position 306.2 within the inode "j" 306. In addition, an offset "2" from 0 within the range (e.g., 0 to N) of the logical address space 302, pointing to the new extent e2, is added to the offset entry position 304.1 within the inode "i" 304; and, an offset "3" from 0 within the range (e.g., 0 to N) of the logical address space 302, pointing to the new extent e3, is added to the offset entry position 306.1 within the inode "j" 306.

As shown in FIG. 3a(4), an extent copy tracker t1 308 is created for performing certain operations in the background, after the transaction has been committed and/or the processing of the transaction has been completed. In this first example, the extent copy tracker t1 308 contains indications of the extent e1, the new extent e2, and the new extent e3, as well as indications of the inode "i" and new extent "e2" (the pointer (offset 2) to which is contained in the inode "i" 304), and the inode "j" and new extent "e3" (the pointer (offset 3) to which is contained in the inode "j" 306). In addition, indications of the extent copy tracker "t1" 308 are added adjacent to the offset entry position 304.1 (offset 2 (e2)) within the inode "i" 304, as well as adjacent to the offset entry position 306.1 (offset 3 (e3)) within the inode "j" 306.

Once the transaction has been committed and/or the processing of the transaction has been completed, the extent copy tracker t1 308 performs certain operations in the background. In this first example, such operations performed in the background by the extent copy tracker t1 308 can include flushing data (e.g., dirty data) from the extent e1, copying data from the extent e1 to the extent e2 (as indicated by an arrow 303; see FIG. 3a(5)), and copying data from the extent e1 to the extent e3 (as indicated by an arrow 305; see also FIG. 3a(5)). Such operations performed in the background by the extent copy tracker t1 308 can further include removing indications of the offset 1 (which points to the extent e1 within the logical address space 302) from both the offset entry position 304.2 within the inode "i" 304 and the offset entry position 306.2 within the inode "j" 306 (see FIG. 3a(6)), and deleting the extent e1 from the logical address space 302 (as indicated by the cross "X" drawn through the extent e1; see FIG. 3a(6)). For example, the extent copy tracker t1 308 can perform each of the flushing operation, the copy operation, and the delete operation by issuing an appropriate call to the mapping manager 120. The extent copy tracker t1 308 is then deleted (as indicated by the cross "X" drawn through the extent copy tracker t1 308; see FIG. 3a(6)), and the indications of the extent copy tracker "t1" 308 adjacent to the offset entry position 304.1 within the inode "i" 304, as well as adjacent to the offset entry position 306.1 within the inode "j" 306, are removed (see FIG. 3a(6)). As a result, the offset 2 in the offset entry position 304.1 within the inode "i" 304 points to the extent e2 in the logical address space 302, which contains the data of the file "a". Further, the offset 3 in the offset entry position 306.1 within the inode "j" 306 points to the extent e3 in the logical address space 302, which contains the data of the file "b" that corresponds to the snapshot of the file "a".

In a second example, as described herein with reference to FIGS. 3b(1)-3(b)(8), a further snapshot of the file "a" is created within the data storage system 106 (see FIG. 1) in a transaction, while performing certain operations during background processing. As shown in FIG. 3b(1), the inode "i" 304 initially includes the offset array having the offset 2 in its offset entry position 304.1, and the offset 1 in its offset entry position 304.2; and, the inode "j" 306 initially includes the offset array having the offset 3 in its offset entry position 306.1, and the offset 1 in its offset entry position 306.2. As shown in FIG. 3b(1), the extent copy tracker t1 308 initially contains the indications of the extent e1, the extent e2, and the extent e3, as well as the indications of the inode "i" and extent "e2" (the pointer (offset 2) to which is contained in the inode "i" 304), and the inode "j" and extent "e3" (the pointer (offset 3) to which is contained in the inode "j" 306). The inode "i" 304 further includes an indication of the extent copy tracker "t1" 308 adjacent the offset entry position 304.1, and the inode "j" 306 further includes an indication of the extent copy tracker "t1" 308 adjacent the offset entry position 306.1.

With reference to FIG. 3b(2), an inode "k" 310 for a file "c" is allocated in the memory 110, and two new extents within the logical address space 302, namely, an extent e4 and an extent e5, are also allocated in the memory 110. The inode "k" 310 includes an offset array having at least offset entry positions 310.1, 310.2, 310.3. As shown in FIG. 3b(3), the offset 2 contained in the offset array of the inode "i" 304 is moved from the offset entry position 304.1 to the offset entry position 304.2, as well as added to the offset entry position 310.2 within the inode "k" 310. Similarly, the offset 1 contained in the offset array of the inode "i" 304 is moved from the offset entry position 304.2 to the offset entry position 304.3, as well as added to the offset entry position 310.3 within the inode "k" 310. In addition, an offset "4" from 0 within the range (e.g., 0 to N) of the logical address space 302, pointing to the new extent e4, is added to the offset entry position 304.1 within the inode "i" 304; and, an offset "5" from 0 within the range (e.g., 0 to N) of the logical address space 302, pointing to the new extent e5, is added to the offset entry position 310.1 within the inode "k" 310. An indication of the inode "k" and extent "e2" (the pointer (offset 2) to which is contained in the inode "k" 310) is also added to the extent copy tracker t1 308.

With reference to FIG. 3b(4), another extent copy tracker t2 312 is created for performing certain operations in the background, after the transaction has been committed and/or the processing of the transaction has been completed. The extent copy tracker t2 312 contains indications of the extent copy tracker t1, the extent e2, the new extent e4, and the new extent e5, as well as indications of the inode "i" and new extent e4 (the pointer (offset 4) to which is contained in the inode "i" 304), and the inode "k" and new extent e5 (the pointer (offset 5) to which is contained in the inode "k" 310). In addition, indications of the extent copy tracker "t2" 312 are added adjacent to the offset entry position 304.1 within the inode "i" 304, as well as adjacent to the offset entry position 310.1 (offset 5 (e5)) of the inode "k" 310.

As described herein, the extent copy tracker t1 308 is configured to perform certain operations in the background, after the transaction has been committed and/or the processing of the transaction has been completed. In this second example, such operations performed in the background by the extent copy tracker t1 308 can include flushing data (e.g., dirty data) from the extent e1, copying data from the extent e1 to the extent e2 (as indicated by an arrow 307; see FIG. 3b(5)), and copying data from the extent e1 to the extent e3 (as indicated by an arrow 309; see also FIG. 3b(5)). Such operations performed in the background by the extent copy tracker t1 308 can further include removing indications of the offset 1 (which points to the extent e1 within the logical address space 302) from both the offset entry position 304.3 within the inode "i" 304 and the offset entry position 306.2 within the inode "j" 306 (see FIG. 3b(6)), and deleting the extent e1 from the logical address space 302 (as indicated by the cross "X" drawn through the extent e1; see FIG. 3b(6)). The extent copy tracker t1 308 is then deleted (as indicated by the cross "X" drawn through the extent copy tracker t1 308; see FIG. 3b(6)), and the indications of the extent copy tracker "t1" 308 adjacent to the offset entry position 304.2 (offset 2 (e2)) within the inode "i" and adjacent to the offset entry position 306.1 (offset 3 (e3)) within the inode "j" are removed (see FIG. 3b(6)).

As further described herein, the extent copy tracker t2 312 also performs certain operations in the background, after the transaction has been committed and/or the processing of the transaction has been completed. It is noted that the extent copy tracker t2 312 performs such operations in the background after the extent copy tracker t1 308 has completed performing its operations in the background. In this second example, such operations performed in the background by the extent copy tracker t2 312 can include flushing data (e.g., dirty data) from the extent e2, copying data from the extent e2 to the extent e4 (as indicated by an arrow 311; see FIG. 3b(7)), and copying data from the extent e2 to the extent e5 (as indicated by an arrow 313; see also FIG. 3b(7)). Such operations performed in the background by the extent copy tracker t2 312 can further include removing indications of the offset 2 (which points to the extent e2 within the logical address space 302) from both the offset entry position 304.2 of the inode "i" 304 and the offset entry position 310.2 of the inode "k" 310 (see FIG. 3b(8)), and deleting the extent e2 from the logical address space 302 (as indicated by the cross "X" drawn through the extent e2; see FIG. 3b(8)). The extent copy tracker t2 312 is then deleted (as indicated by the cross "X" drawn through the extent copy tracker t2 312; see FIG. 3b(8)), and the indications of the extent copy tracker "t2" 312 adjacent to the offset entry position 304.1 (offset 4 (e4)) within the inode "i" 304 and adjacent to the offset entry position 310.1 (offset 5 (e5)) within the inode "k" 310 are removed (see FIG. 3b(8)). As a result, the offset 4 in the offset entry position 304.1 within the inode "i" 304 points to the extent e4 in the logical address space 302 containing the data of the file "a"; the offset 3 in the offset entry position 306.1 within the inode "j" 306 points to the extent e3 in the logical address space 302 containing the data of the file "b", which corresponds to a first snapshot of file "a"; and, the offset 5 in the offset entry position 310.1 within the inode "k" 310 points to the extent e5 in the logical address space 302 containing the data of the file "c", which corresponds to a second snapshot of file "a".

In a third example, as described herein with reference to FIGS. 3c(1)-3c(5), the file "a" is deleted from the data storage system 106 (see FIG. 1). As shown in FIG. 3c(1), the inode "i" 304 initially includes the offset array having the offset 4 in its offset entry position 304.1, the offset 2 in its offset entry position 304.2, and the offset 1 in its offset entry position 304.3. Further, the inode "j" 306 initially includes the offset array having the offset 3 in its offset entry position 306.1, and the offset 1 in its offset entry position 306.2. Still further, the inode "k" 310 initially includes the offset array having the offset 5 in its offset entry position 310.1, the offset 2 in its offset entry position 310.2, and the offset 1 in its offset entry position 310.3. In addition, the extent copy tracker t1 308 initially contains the indications of the extent e1, the extent e2, and the extent e3, as well as the indications of the inode "i" and extent e2 (the pointer (offset 2) to which is contained in the inode "i" 304), the inode "j" and extent e3 (the pointer (offset 3) to which is contained in the inode "j" 306), and the inode "k" and extent e2 (the pointer (offset 2) to which is contained in the inode "k" 310). Further, the extent copy tracker t2 312 initially contains the indications of the extent copy tracker t1, the extent e2, the extent e4, and the extent e5, as well as the indications of the inode "i" and extent e4 (the pointer (offset 4) to which is contained in the inode "i" 304), and the inode "k" and extent e5 (the pointer (offset 5) to which is contained in the inode "k" 310). The inode "i" 304 further includes the indication of the extent copy tracker "t2" 312 adjacent the offset entry position 304.1, and the indication of the extent copy tracker "t1" 308 adjacent the offset entry position 304.2. The inode "j" 306 further includes the indication of the extent copy tracker "t1" 308 adjacent the offset entry position 306.1. The inode "k" 310 further includes the indication of the extent copy tracker "t2" 312 adjacent the offset entry position 310.1, and the indication of the extent copy tracker "t1" 308 adjacent the offset entry position 310.2.

As described herein, the inode "i" 304 includes the offset array having the offset 4 in its offset entry position 304.1, the offset 2 in its offset entry position 304.2, and the offset 1 in its offset entry position 304.3, as well as the indication of the extent copy tracker "t2" 312 adjacent the offset entry position 304.1, and the indication of the extent copy tracker "t1" 308 adjacent the offset entry position 304.2. In this third example, to delete the file "a" from the data storage system 106 (see FIG. 1), the offsets 4, 2, 1 are removed from the offset entry positions 304.1, 304.2, 304.3, respectively, within the inode "i" 304.

To that end, the indication of the inode "i" and extent e4 (the pointer (offset 4) to which is contained in the inode "i" 304) is removed from the extent copy tracker t2 312 (see FIG. 3c(2)), and the indication of the extent e4 is also removed from the extent copy tracker t2 312, so long as no other inodes indicated in the extent copy tracker t2 312 make reference to the extent e4 (see FIG. 3c(2)). Further, the extent e4 is deleted from the logical address space 302 (as indicated by the cross "X" drawn through the extent e4; see FIG. 3c(3)). It is noted that such deletion of the extent e4 can be performed during background processing. The offset 4 is then removed from the offset entry position 304.1 within the inode "i" 304 (see FIG. 3c(3)). In addition, the indication of the inode "i" and extent e2 (the pointer (offset 2) to which is contained in the inode "i" 304) is removed from the extent copy tracker t1 308 (see FIG. 3c(4)), and the offset 2 is removed from the offset entry position 304.2 within the inode "i" 304 (see FIG. 3c(5)). The offset 1 is then removed from the offset entry position 304.3 within the inode "i" 304 (see FIG. 3c(5)). As a result, all pointers are deleted from the offset entry positions 304.1, 304.2, 304.3 within the inode "i" 304, thereby effectively deleting the file "a" from the data storage system 106.

In a fourth example, as described herein with reference to 3d(1)-3(d)(4), the size of the file "a" is changed within the data storage system 106 (see FIG. 1). As shown in FIG. 3d(1), the inode "i" 304 initially includes the offset array having the offset 4 in its offset entry position 304.1, the offset 2 in its offset entry position 304.2, and the offset 1 in its offset entry position 304.3. Further, the inode "j" 306 initially includes the offset array having the offset 3 in its offset entry position 306.1, and the offset 1 in its offset entry position 306.2. Still further, the inode "k" 310 initially includes the offset array having the offset 5 in its offset entry position 310.1, the offset 2 in its offset entry position 310.2, and the offset 1 in its offset entry position 310.3. In addition, the extent copy tracker t1 308 initially contains the indications of the extent e1, the extent e2, and the extent e3, as well as the indications of the inode "i" and extent e2 (the pointer (offset 2) to which is contained in the inode "i" 304), the inode "j" and extent e3 (the pointer (offset 3) to which is contained in the inode "j" 306), and the inode "k" and extent e2 (the pointer (offset 2) to which is contained in the inode "k" 310). Further, the extent copy tracker t2 312 initially contains the indications of the extent copy tracker t1, the extent e2, the extent e4, and the extent e5, as well as the indications of the inode "i" and extent e4 (the pointer (offset 4) to which is contained in the inode "i" 304), and the inode "k" and extent e5 (the pointer (offset 5) to which is contained in the inode "k" 310). The inode "i" 304 further includes the indication of the extent copy tracker "t2" 312 adjacent the offset entry position 304.1, and the indication of the extent copy tracker "t1" 308 adjacent the offset entry position 304.2. The inode "j" 306 further includes the indication of the extent copy tracker "t1" 308 adjacent the offset entry position 306.1. The inode "k" 310 further includes the indication of the extent copy tracker "t2" 312 adjacent the offset entry position 310.1, and the indication of the extent copy tracker "t1" 308 adjacent the offset entry position 310.2.

With reference to FIG. 3d(2), a new extent e6 is allocated in the memory 110 within the logical address space 302. Further, as shown in FIG. 3d(3), in the offset array of the inode "i" 304, the offset 1 is moved from the offset entry position 304.3 to the offset entry position 304.4, the offset 2 is moved from the offset entry position 304.2 to the offset entry position 304.3, and the offset 4 is moved from the offset entry position 304.1 to the offset entry position 304.2. Further, an offset "6" from 0 within the range (e.g., 0 to N) of the logical address space 302, pointing to the new extent e6, is added to the offset entry position 304.1 within the inode "i" 304.

With reference to FIG. 3d(4), yet another extent copy tracker t3 314 is created for performing certain operations in the background, after the transaction has been committed and/or the processing of the transaction has been completed. It is noted that the extent copy tracker t2 312 can perform its operations in the background after the extent copy tracker t1 308 has completed performing its operations in the background, and that the extent copy tracker t3 314 can perform its operations in the background after the extent copy tracker t2 312 has completed performing its operations in the background. The extent copy tracker t3 314 contains indications of the extent copy tracker t1, the extent e4, and the new extent e6, as well as an indication of the inode "i" and new extent e6 (the pointer (offset 6) to which is contained in the inode "i" 304). In addition, an indication of the extent copy tracker "t3" 314 is added adjacent to the offset entry position 304.1 within the inode "i" 304. As a result, the offset array of the inode "i" 304 contains the offset 6, the offset 4, the offset 2, and the offset 1 in its offset entry positions 304.1, 304.2, 304.3, and 304.4, respectively, thereby effectively changing the overall size of the file "a" through the addition of the new extent e6.

In a fifth example, as described herein with reference to 3e(1)-3e(3), a reversion of the file "a" is performed from the file "b", which, as described in the second example, corresponds to the first snapshot of the file "a". As shown in FIG. 3e(1), the inode "i" 304 initially includes the offset array having the offset 6 in its offset entry position 304.1, the offset 4 in its offset entry position 304.2, the offset 2 in its offset entry position 304.3, and the offset 1 in its offset entry position 304.4. Further, the inode "j" 306 initially includes the offset array having the offset 3 in its offset entry position 306.1, and the offset 1 in its offset entry position 306.2. Still further, the inode "k" 310 initially includes the offset array having the offset 5 in its offset entry position 310.1, the offset 2 in its offset entry position 310.2, and the offset 1 in its offset entry position 310.3. In addition, the extent copy tracker t1 308 initially contains the indications of the extent e1, the extent e2, and the extent e3, as well as the indications of the inode "i" and extent e2 (the pointer (offset 2) to which is contained in the inode "i" 304), the inode "j" and extent e3 (the pointer (offset 3) to which is contained in the inode "j" 306), and the inode "k" and extent e2 (the pointer (offset 2) to which is contained in the inode "k" 310). Further, the extent copy tracker t2 312 (see FIG. 3e(1)(Cont.)) initially contains the indications of the extent copy tracker t1, the extent e2, the extent e4, and the extent e5, as well as the indications of the inode "i" and extent e4 (the pointer (offset 4) to which is contained in the inode "i" 304), and the inode "k" and extent e5 (the pointer (offset 5) to which is contained in the inode "k" 310). Still further, the extent copy tracker t3 314 (see FIG. 3e(1)(Cont.)) initially contains the indications of the extent copy tracker t1, the extent e4, and the extent e6, as well as the indication of the inode "i" and extent e6 (the pointer (offset 6) to which is contained in the inode "i" 304). The inode "i" 304 further includes the indication of the extent copy tracker "t3" 314 adjacent the offset entry position 304.1, the indication of the extent copy tracker "t2" 312 adjacent the offset entry position 304.2, and the indication of the extent copy tracker "t1" 308 adjacent the offset entry position 304.3. The inode "j" 306 further includes the indication of the extent copy tracker "t1" 308 adjacent the offset entry position 306.1. The inode "k" 310 further includes the indication of the extent copy tracker "t2" 312 adjacent the offset entry position 310.1, and the indication of the extent copy tracker "t1" 308 adjacent the offset entry position 310.2.

To revert the file "a" from the first snapshot of the file "a" (i.e., file "b"), all of the pointers (i.e., offset 6, offset 4, offset 2, offset 1) are deleted from the offset entry positions 304.1, 304.2, 304.3, 304.4 within the inode "i" 304 (see FIG. 3e(2)). For example, the deletion of the pointers from the offset entry positions 304.1, 304.2, 304.3, 304.4 can be performed in a manner similar to that described with reference to FIG. 3c(5) in the third example. Because the pointers to the extent e4 and the extent e6 are deleted from their offset entry positions 304.2 and 304.1, respectively, the extents e4 and e6 are also deleted from the logical address space 302 (see FIG. 3e(2)). Further, the indication of the inode "i" and extent e2 (the pointer (offset 2) to which was contained in the inode "i" 304) is removed from the extent copy tracker t1 308 (see FIG. 3e(2)), the indication of the inode "i" and extent e4 (the pointer (offset 4) to which was contained in the inode "i" 304) is removed from the extent copy tracker t2 312 (see FIG. 3e(2)), and the indication of the extent e4 is removed from the extent copy tracker t2 312 (see FIG. 3e(2)). It is noted that the indication of the inode "i" and extent e6 (the pointer (offset 6) to which was contained in the inode "i" 304), as well as the indications of the extent e4 and the extent e6, are also removed from the extent copy tracker t3 314, which is subsequently deleted.

It is further noted that, in this fifth example, a new extent e7 and a new extent e8 (see FIG. 3e(3)) can be allocated in the memory 110 within the logical address space 302, and data can be copied from the extent e3 to each of the new extents e7, e8. As described herein with reference to the first example, the data from the extent e3 was originally copied from the extent e1 (as indicated by the arrow 305; see FIG. 3a(5)). Further, an offset "8" from 0 within the range (e.g., 0 to N) of the logical address space 302, pointing to the new extent 8, can be added to the offset entry position 304.1 within the inode "i" 304 (see FIG. 3e(3)); and, an offset "7" from 0 within the range (e.g., 0 to N) of the logical address space 302, pointing to the new extent 7, can be added to the offset entry position 306.1 within the inode "i" 306 (see also FIG. 3e(3)). In addition, an extent copy tracker t4 316 can be created for performing certain operations in the background, after the transaction has been committed and/or the processing of the transaction has been completed. In this fifth example, the extent copy tracker t4 316 contains indications of the extent e3, the new extent e7, and the new extent e8, as well as indications of the inode "j" and new extent "e7" (the pointer (offset 7) to which is contained in the inode "j" 306), and the inode "i" and new extent "e8" (the pointer (offset 8) to which is contained in the inode "i" 304). In addition, indications of the extent copy tracker "t4" 316 can be added adjacent to the offset entry position 304.1 (offset 8 (e8)) within the inode "i" 304, as well as adjacent to the offset entry position 306.1 (offset 7 (e7)) within the inode "j" 306. As a result, having reverted the file "a" from the first snapshot of the file "a" (i.e., file "b"), the file "b" again corresponds to an actual snapshot of the file "a".

Figure 4:
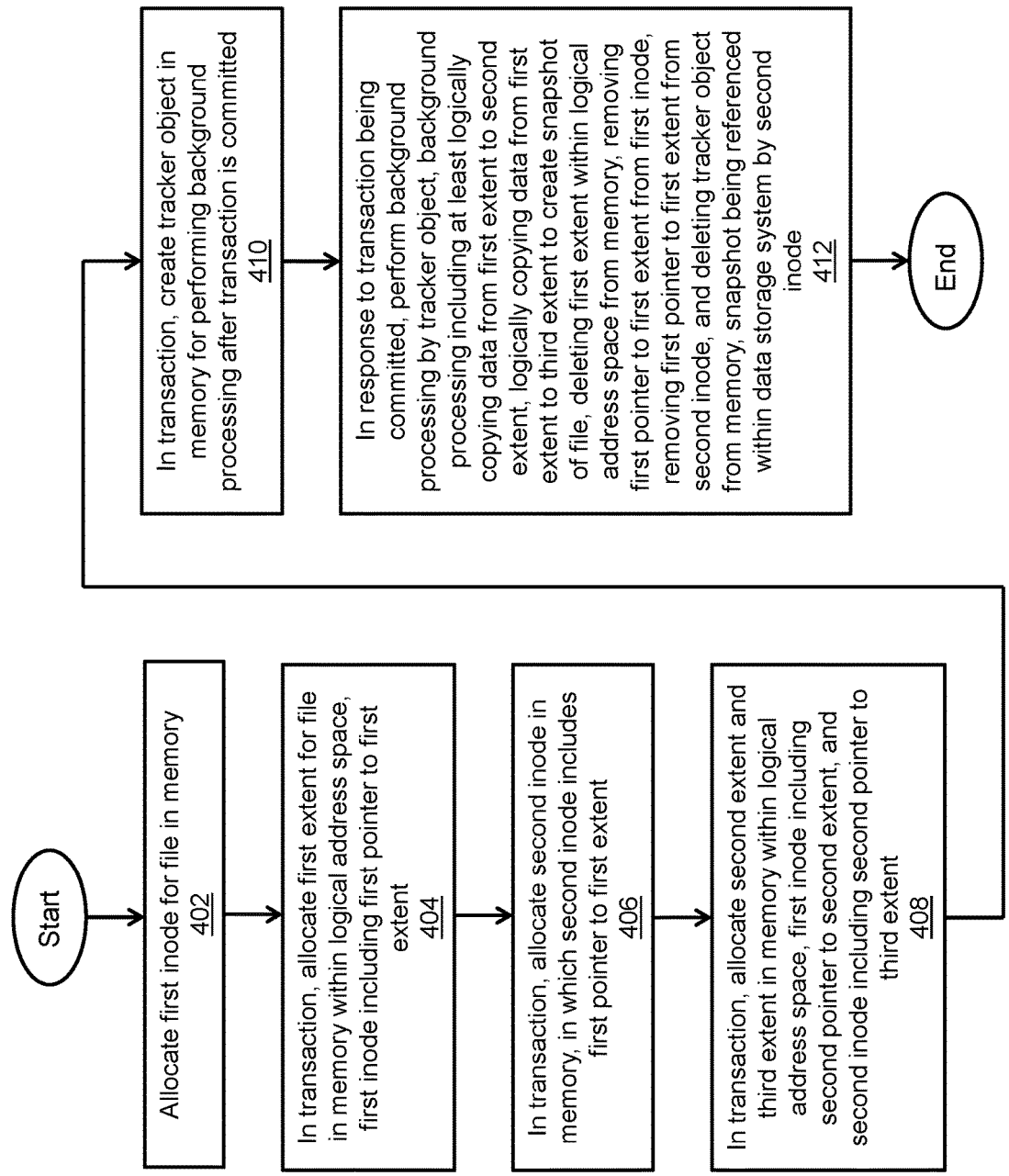
FIG. 4 is a flow diagram of an exemplary method of performing certain snapshot operations during background processing within the data storage system of FIG. 1.

A method of performing snapshot operations during background processing within a data storage system is described below with reference to FIG. 4. As depicted in block 402, a first inode for a file is allocated in memory. As depicted in block 404, in a transaction, a first extent for the file is allocated in the memory within a logical address space, in which the first inode includes a first pointer to the first extent. As depicted in block 406, in the transaction, a second inode is allocated in the memory, in which the second inode includes a first pointer to the first extent. As depicted in block 408, in the transaction, a second extent and a third extent are allocated in the memory within the logical address space, in which the first inode includes a second pointer to the second extent and the second inode includes a second pointer to the third extent. As depicted in block 410, in the transaction, a tracker object is created in the memory for performing background processing after the transaction is committed. As depicted in block 412, in response to the transaction being committed, the background processing is performed by the tracker object, including at least logically copying data from the first extent to the second extent, logically copying the data from the first extent to the third extent to create a snapshot of the file, deleting the first extent within the logical address space from the memory, removing the first pointer to the first extent from the first inode, removing the first pointer to the first extent from the second inode, and deleting the tracker object from the memory. The snapshot is referenced within the data storage system by the second inode.

It is noted that the disclosed systems and methods or portions thereof may be embodied as a computer program product including one or more non-transient, computer-readable storage media, such as a magnetic disk, magnetic tape, compact disk, DVD, optical disk, flash drive, solid state drive (SSD), Secure Digital (SD) chip or device, Application Specific Integrated Circuit (ASIC), Field Programmable Gate Array (FPGA), and/or the like. Any number of computer-readable media may be used. The media may be encoded with instructions which, when executed on one or more computers or other processors, perform the process or processes described herein. Such media may be considered articles of manufacture or machines, and may be transportable from one machine to another.

While various embodiments of the invention have been particularly shown and described, it will be understood by those skilled in the art that various changes in form and details may be made therein without departing from the scope of the invention as defined by the appended claims.

What is claimed is:

1. A method of performing one or more snapshot operations during background processing within a data storage system, the data storage system including a memory, a first index node (inode) for a file being allocated in the memory, a first extent for the file being allocated in the memory within a logical address space, and the first inode including a first pointer to the first extent for the file, the method comprising:
processing a transaction, the processing of the transaction comprising:
allocating a second inode in the memory;
allocating a second extent in the memory within the logical address space, the first inode including a second pointer to the second extent;
allocating a third extent in the memory within the logical address space, the second inode including a third pointer to the third extent; and creating a tracker object in the memory for use in performing the background processing after the processing of the transaction has completed, the creating of the tracker object comprising:
incorporating an indication of the first extent into the tracker object;
incorporating an indication of the second extent into the tracker object;
incorporating an indication of the third extent into the tracker object;
incorporating, into the tracker object, indications of the first inode and the second extent pointed to by the second pointer contained in the first inode; and
incorporating, into the tracker object, indications of the second inode and the third extent pointed to by the third pointer contained in the second inode; and
in response to the processing of the transaction having been completed, performing the background processing based at least on (i) the indication of the first extent, (ii) the indication of the second extent, (iii) the indication of the third extent, (iv) the indications of the first inode and the second extent, and (v) the indications of the second inode and the third extent being incorporated into the tracker object, the background processing comprising at least:
logically copying data from the first extent for the file to the second extent;
logically copying the data from the first extent for the file to the third extent to create a snapshot of the file;
referencing the second extent containing the data of the file by the second pointer included in the first inode;
referencing the third extent containing the snapshot of the file by the third pointer included in the second inode; and
deleting the entire tracker object from the memory.

2. The method of claim 1 further comprising:
incorporating a copy of the first pointer to the first extent into the second inode.

3. The method of claim 2 wherein the performing of the background processing further includes deleting the first extent within the logical address space from the memory.

4. The method of claim 3 wherein the performing of the background processing further includes removing the first pointer to the first extent from the first inode.

5. The method of claim 4 wherein the performing of the background processing further includes removing the copy of the first pointer to the first extent from the second inode.

6. The method of claim 1 wherein the performing of the background processing further comprises:
prior to logically copying the data from the first extent for the file to the second extent and logically copying the data from the first extent for the file to the third extent to create a snapshot of the file, flushing dirty data from the first extent for the file.

7. The method of claim 1 wherein each of the first inode and the second inode includes an offset array, wherein the first pointer to the first extent for the file is contained in a first offset entry position in the offset array of the first inode, and wherein the performing of the background processing further comprises:
once the second extent and the third extent are allocated within the logical address space:
moving the first pointer to the first extent for the file from the first offset entry position to a second offset entry position in the offset array of the first inode;
adding the second pointer to the second extent to the first offset entry position in the offset array of the first inode;
adding the third pointer to the third extent to a first offset entry position in the offset array of the second inode; and
adding a copy of the first pointer to the first extent for the file to a second offset entry position in the offset array of the second inode.

8. A system for performing one or more snapshot operations during background processing, comprising:
storage processing circuitry; and
a memory,
wherein a first index node (inode) for a file is allocated in the memory,
wherein a first extent for the file is allocated in the memory within a logical address space,
wherein the first inode includes a first pointer to the first extent for the file,
wherein the storage processing circuitry is configured to execute instructions out of the memory:
to process a transaction, processing of the transaction comprising executing the instructions out of the memory:
to allocate a second inode in the memory;
to allocate a second extent in the memory within the logical address space, the first inode including a second pointer to the second extent;
to allocate a third extent in the memory within the logical address space, the second inode including a third pointer to the third extent; and
to create a tracker object in the memory for use in performing the background processing after the processing of the transaction has completed, the tracker object being created by:
incorporating an indication of the first extent into the tracker object;
incorporating an indication of the second extent into the tracker object;
incorporating an indication of the third extent into the tracker object;
incorporating into the tracker object, indications of the first inode and the second extent pointed to by the second pointer contained in the first inode; and
incorporating, into the tracker object, indications of the second inode and the third extent pointed to by the third pointer contained in the second inode, and
wherein, in response to the processing of the transaction having been completed, the storage processing circuitry is further configured to execute the instructions out of the memory to perform the background processing based at least on (i) the indication of the first extent, (ii) the indication of the second extent, (iii) the indication of the third extent, (iv) the indications of the first inode and the second extent, and (v) the indications of the second inode and the third extent being incorporated into the tracker object, the background processing comprising at least:
logically copying data from the first extent for the file to the second extent;
logically copying the data from the first extent for the file to the third extent to create a snapshot of the file;
referencing the second extent containing the data of the file by the second pointer included in the first inode;

referencing the third extent containing the snapshot of the file by the third pointer included in the second inode; and deleting the entire tracker object from the memory.

9. The system of claim 8 wherein the storage processing circuitry is further configured to execute the instructions out of the memory to incorporate the first pointer to the first extent into the second inode.

10. The system of claim 9 wherein, in response to the transaction being committed, the storage processing circuitry is further configured to execute the instructions out of the memory to perform, by the tracker object, the background processing including deleting the first extent within the logical address space from the memory.

11. The system of claim 10 wherein, in response to the transaction being committed, the storage processing circuitry is further configured to execute the instructions out of the memory to perform, by the tracker object, the background processing including removing the first pointer to the first extent from the first inode.

12. The system of claim 11 wherein, in response to the transaction being committed, the storage processing circuitry is further configured to execute the instructions out of the memory to perform, by the tracker object, the background processing including removing the first pointer to the first extent from the second inode.

13. The system of claim 8 wherein, having logically copied the data from the first extent to each of the second extent and the third extent, the memory is configured to maintain a namespace of objects including a first object made up of the second extent and a second object made up of the third extent.

14. The system of claim 13 wherein each of the first object and the second object is one of a logical storage unit (LUN) and a virtual machine volume (VVOL).

15. A computer program product having a non-transitory computer readable medium that stores a set of instructions to perform one or more snapshot operations during background processing within a data storage system, the data storage system including a memory, a first index node (inode) for a file being allocated in the memory, a first extent for the file being allocated in the memory within a logical address space, and the first inode including a first pointer to the first extent for the file, the set of instructions, when carried out by computerized circuitry, causing the computerized circuitry to perform a method of:

processing a transaction, the processing of the transaction comprising:

allocating a second inode in the memory;

allocating a second extent in the memory within the logical address space, the first inode including a second pointer to the second extent;

allocating a third extent in the memory within the logical address space, the second inode including a third pointer to the third extent; and creating a tracker object in the memory for use in performing the background processing after the processing of the transaction has completed, the creating of the tracker object comprising:

incorporating an indication of the first extent into the tracker object;

incorporating an indication of the second extent into the tracker object;

incorporating an indication of the third extent into the tracker object;

incorporating, into the tracker object, indications of the first inode and the second extent pointed to by the second pointer contained in the first inode; and incorporating, into the tracker object, indications of the second inode and the third extent pointed to by the third pointer contained in the second inode; and in response to the processing of the transaction having been completed, performing the background processing based at least on (i) the indication of the first extent, (ii) the indication of the second extent, (iii) the indication of the third extent, (iv) the indications of the first inode and the second extent, and (v) the indications of the second inode and the third extent being incorporated into the tracker object, the background processing comprising at least:

logically copying data from the first extent for the file to the second extent;

logically copying the data from the first extent for the file to the third extent to create a snapshot of the file;

referencing the second extent containing the data of the file by the second pointer included in the first inode;

referencing the third extent containing the snapshot of the file by the third pointer included in the second inode; and deleting the entire tracker object from the memory.

16. The method of claim 15 further comprising:

incorporating a copy of the first pointer to the first extent into the second inode.

17. The method of claim 16 wherein the performing of the background processing further includes deleting the first extent within the logical address space from the memory.

18. The method of claim 17 wherein the performing of the background processing further includes removing the first pointer to the first extent from the first inode.

19. The method of claim 18 wherein the performing of the background processing further includes removing the copy of the first pointer to the first extent from the second inode.

* * * * *